United States Patent
Zhang et al.

(10) Patent No.: US 10,884,761 B2
(45) Date of Patent: Jan. 5, 2021

(54) BEST PERFORMANCE DELIVERY IN HETEROGENEOUS COMPUTING UNIT ENVIRONMENT

(71) Applicant: LENOVO Enterprise Solutions (Singapore) PTE. LTD, New Tech Park (SG)

(72) Inventors: Jianbang Zhang, Cary, NC (US); John W. Nicholson, Cary, NC (US); Michael T. Vanover, Raleigh, NC (US)

(73) Assignee: LENOVO Enterprise Solutions (Singapore) PTE. LTD, New Tech Park (SG)

( * ) Notice: Subject to any disclaimer, the term of this patent is extended or adjusted under 35 U.S.C. 154(b) by 0 days.

(21) Appl. No.: 15/077,691

(22) Filed: Mar. 22, 2016

(65) Prior Publication Data

US 2017/0277550 A1    Sep. 28, 2017

(51) Int. Cl.
| | | |
|---|---|---|
| *G06F 9/445* | (2018.01) | |
| *G06F 9/50* | (2006.01) | |
| *G06F 9/448* | (2018.01) | |
| *G06F 11/34* | (2006.01) | |
| *G06F 11/30* | (2006.01) | |

(52) U.S. Cl.
CPC ........ *G06F 9/44505* (2013.01); *G06F 9/4484* (2018.02); *G06F 9/50* (2013.01); *G06F 11/3024* (2013.01); *G06F 11/3409* (2013.01)

(58) Field of Classification Search
CPC ............. G06F 9/44505; G06F 11/3024; G06F 11/3409; G06F 1/3203
See application file for complete search history.

(56) References Cited

U.S. PATENT DOCUMENTS

| | | |
|---|---|---|
| 7,079,149 B2 | 7/2006 | Main et al. |
| 7,100,015 B1 | 8/2006 | Mathiske et al. |
| 7,725,603 B1 | 5/2010 | Kanevsky |
| 8,645,390 B1 | 2/2014 | Oztekin |
| 10,203,747 B2 | 2/2019 | Nicholson et al. |
| 2005/0235287 A1 | 10/2005 | Harper |
| 2007/0067606 A1* | 3/2007 | Lin .................. G06F 9/5044 712/10 |
| 2007/0113048 A1 | 5/2007 | Royer et al. |
| 2007/0294673 A1 | 12/2007 | Guerrera et al. |
| 2008/0098207 A1 | 4/2008 | Reid et al. |

(Continued)

OTHER PUBLICATIONS

U.S. Appl. No. 15/077,635, filed Mar. 22, 2016, Office Action dated Aug. 15, 2017.

(Continued)

*Primary Examiner* — Jaweed A Abbaszadeh
*Assistant Examiner* — Gayathri Sampath
(74) *Attorney, Agent, or Firm* — Kunzler Bean & Adamson; Bruce R. Needham

(57) ABSTRACT

An apparatus for selecting an efficient processor includes a comparison module that compares performance characteristics of a plurality of processors available for execution of a function, where each performance characteristic varies as a function of function size. The apparatus includes a selection module that selects, based on a size of the function, a processor from the plurality of processors with a best performance for execution of the function, and an execution module that executes the function on the selected processor.

16 Claims, 17 Drawing Sheets

(56) References Cited

U.S. PATENT DOCUMENTS

| | | |
|---|---|---|
| 2008/0184042 A1 | 7/2008 | Parks |
| 2008/0320498 A1 | 12/2008 | Maykov et al. |
| 2009/0083753 A1 | 3/2009 | Tzruya |
| 2009/0109230 A1 | 4/2009 | Miller |
| 2009/0271801 A1 | 10/2009 | Bratanov |
| 2010/0048242 A1 | 2/2010 | Rhoads et al. |
| 2010/0049963 A1* | 2/2010 | Bell, Jr. .............. G06F 15/7871 713/100 |
| 2010/0156888 A1 | 6/2010 | Luk et al. |
| 2010/0198997 A1 | 8/2010 | Archer |
| 2011/0173155 A1 | 7/2011 | Becchi |
| 2012/0060012 A1 | 3/2012 | Olszewski |
| 2012/0154412 A1* | 6/2012 | Harney ................. G06F 9/5011 345/522 |
| 2012/0236002 A1 | 9/2012 | Bi et al. |
| 2013/0050229 A1* | 2/2013 | Song ....................... G06F 7/504 345/502 |
| 2013/0054669 A1 | 2/2013 | Nachreiner et al. |
| 2013/0073875 A1* | 3/2013 | Anderson ............ G06F 9/5094 713/300 |
| 2013/0232477 A1 | 9/2013 | Griffin |
| 2013/0347009 A1 | 12/2013 | Hall |
| 2014/0025927 A1 | 1/2014 | Bradbury |
| 2014/0026111 A1 | 1/2014 | Stitt |
| 2014/0080428 A1 | 3/2014 | Rhoads et al. |
| 2014/0189317 A1 | 7/2014 | Ben-Kiki et al. |
| 2014/0208072 A1 | 7/2014 | Cadambi |
| 2014/0372810 A1* | 12/2014 | Na ....................... G06F 11/3433 714/47.1 |
| 2014/0372990 A1 | 12/2014 | Strauss |
| 2015/0033227 A1 | 1/2015 | Lin |
| 2015/0046679 A1* | 2/2015 | Gathala .................. G06F 8/443 712/30 |
| 2015/0082317 A1 | 3/2015 | You et al. |
| 2015/0121105 A1* | 4/2015 | Ahn ........................ G06F 1/324 713/322 |
| 2015/0293794 A1* | 10/2015 | Levin ...................... G06F 9/505 718/104 |
| 2016/0062798 A1* | 3/2016 | Lee ....................... G06F 9/4881 718/104 |
| 2016/0163015 A1 | 6/2016 | Riguer et al. |
| 2016/0378568 A1 | 12/2016 | Knox et al. |
| 2017/0083383 A1* | 3/2017 | Rider ..................... G06F 9/5094 |
| 2017/0116004 A1 | 4/2017 | Devegowda |

OTHER PUBLICATIONS

U.S. Appl. No. 15/077,635, filed Mar. 22, 2016, Final Office Action dated Apr. 2, 2018.
U.S. Appl. No. 15/077,698, filed Mar. 22, 2016, Office Action dated Apr. 10, 2018.
Automation Direct Modular Software Simplifies Complex Programming Issue 26 2013.
NVIDIA CUDA 6 Unified Memory for CUDA 2013.
Song et al. "Performance Review of Zero Copy Techniques", Year 2012.
U.S. Appl. No. 15/077,625, filed Mar. 22, 2016, Final Office Action dated Nov. 29, 2018.
U.S. Appl. No. 15/077,635, filed Mar. 22, 2016, Notice of Allowance dated Sep. 21, 2018.
U.S. Appl. No. 15/077,698, filed Mar. 22, 2016, Final Office Action dated Oct. 19, 2018.
U.S. Appl. No. 15/077,625, filed Mar. 22, 2016, Office Action dated Apr. 26, 2018.
U.S. Appl. No. 15/077,698, Final Office Action Summary, dated Mar. 22, 2016.
U.S. Appl. No. 15/077,625, Advisory Action, dated Apr. 10, 2019.
U.S. Appl. No. 15/077,625, filed Mar. 22, 2016, Advisory Action dated Apr. 10, 2019.
U.S. Appl. No. 15/077,625, filed Mar. 22, 2016, Notice of Allowance dated Jun. 19, 2019.
U.S. Appl. No. 15/077,698, filed Mar. 22, 2016, Final Office Action, dated Aug. 30, 2019.
A Simple Approach to Shared Storage Database Servers by Soares (Year: 2009).
Performance Directed Energy Management for Main Memory and Disks by Li ( Year: 2004).
U.S. Appl. No. 15/077,698, Office Action, dated Dec. 11, 2019, pp. 1-24.
Horton, Ivor, "Beginning C", Third Edition, The Experts Voice (Year: 2004).
U.S. Appl. No. 15/077,698, Final Office Action, dated Apr. 30, 2020, pp. 1-30.
U.S. Appl. No. 15/077,698, Notice of Allowance, dated Aug. 12, 2020, pp. 1-35.
U.S. Appl. No. 15/077,698, Advisory Action, dated Aug. 7, 2020, pp. 1-8.

* cited by examiner

BEST PERFORMANCE DELIVERY IN HETEROGENEOUS COMPUTING UNIT ENVIRONMENT

FIELD

The subject matter disclosed herein relates to function calls and specifically to comparing performance characteristics of a plurality of processors available for execution of a function and selecting a processor with a best performance for execution of the function.

BACKGROUND

When executing a program, it is common for the program to include a function call. Typically, the function call is coded to include a call to a specific function executing on as specific processor. The function is typically part of a library of functions of a processor, such as a graphical processing unit ("GPU"), accelerator, etc. A function often executes a particular type of task. For example, a function may be for execution of a fast Fourier transform ("FFT"), a linear regression, or other calculation-intensive function. However, the specified function and associated processor may not be the best choice and other available functions and processors may be a better choice. Depending on the function, a memory management method other than a current memory management method may also be a better choice.

BRIEF SUMMARY

An apparatus for selecting an efficient processor is disclosed. A method and computer program product also perform the functions of the apparatus. The apparatus includes a comparison module that compares performance characteristics of a plurality of processors available for execution of a function, where each performance characteristic varies as a function of function size. The apparatus includes a selection module that selects, based on a size of the function, a processor from the plurality of processors with a best performance for execution of the function, and an execution module that executes the function on the selected processor.

In one embodiment, the apparatus includes a performance module that determines the performance characteristic of each of the plurality of processors. In another embodiment, the performance module includes a performance calculation module that calculates performance of an executed function executed on a processor, and a correlation module that correlates a size of each executed function to performance during execution of the function to determine a performance characteristic of the processor.

In another embodiment, the apparatus includes a context module that tracks a context for each function executed on a processor and the comparison module compares performance characteristics of the plurality of processors available for execution of a function with similar contexts. In another embodiment, the performance module determines the performance characteristic of each of the plurality of processors based on information supplied with the function, information from a vendor, and/or function execution data from previously executed functions. In another embodiment, the performance module includes an update module that updates an initial performance characteristic of a processor based on the function execution data from previously executed functions.

In one embodiment, the selection module selects multiple processors from the plurality of processors with similar best performance characteristics, based on the size of the function, for execution of the function and the execution module executes the function on the multiple selected processors. In a further embodiment, the selection module uses information from a call stack and/or a return address to determine a context of a function. In another embodiment, the apparatus includes a format module that, in response to the selection module selecting a processor for execution of the function, formats the function for execution on the selected processor, where the function is formatted for a central-processing unit ("CPU") prior to formatting by the format module.

In one embodiment, the performance characteristics of the plurality of processors include speed of execution, energy efficiency, and/or cost of execution of a functions of various sizes. In another embodiment, each of the plurality of processors includes a field-programmable gate array ("FPGA"), a graphics processing unit ("GPU"), an accelerated processing unit ("APU"), a central processing unit ("CPU"), a digital signal processor ("DSP") and/or a processor of a computing device different from a computing device executing an application comprising the function.

A method for selecting an efficient processor includes comparing performance characteristics of a plurality of processors available for execution of a function, where each performance characteristic varies as a function of function size. The method includes selecting, based on a size of the function, a processor from the plurality of processors with a best performance for execution of the function, and executing the function on the selected processor.

In one embodiment, the method includes determining the performance characteristic of each of the plurality of processors. In another embodiment, determining the performance characteristic of each of the plurality of processors also includes calculating performance of an executed function executed on a processor, and correlating a size of each executed function to performance during execution of the function to determine a performance characteristic of the processor. In another embodiment, includes tracking a context for each function executed on a processor and comparing performance characteristics of a plurality of processors available for execution of a function includes comparing performance characteristics of the plurality of processors available for execution of a function with similar contexts.

In one embodiment, determining the performance characteristic of each of the plurality of processors is based on information supplied with the function, information from a vendor associated with the processor, and/or function execution data from previously executed functions. In another embodiment, determining the performance characteristic of each of the plurality of processors also includes updating an initial performance characteristic of a processor based on the function execution data from previously executed functions.

A program product for selecting an efficient processor includes a computer readable storage medium that stores code executable by a processor. The executable code includes code to perform comparing performance characteristics of a plurality of processors available for execution of a function, where each performance characteristic varies as a function of function size, selecting, based on a size of the function, a processor from the plurality of processors with a best performance for execution of the function, and executing the function on the selected processor.

In one embodiment, the code includes determining the performance characteristic of each of the plurality of processors. In another embodiment, determining the performance characteristic of each of the plurality of processors includes calculating performance of an executed function executed on a processor, and correlating a size of each executed function to performance during execution of the function to determine a performance characteristic of the processor.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
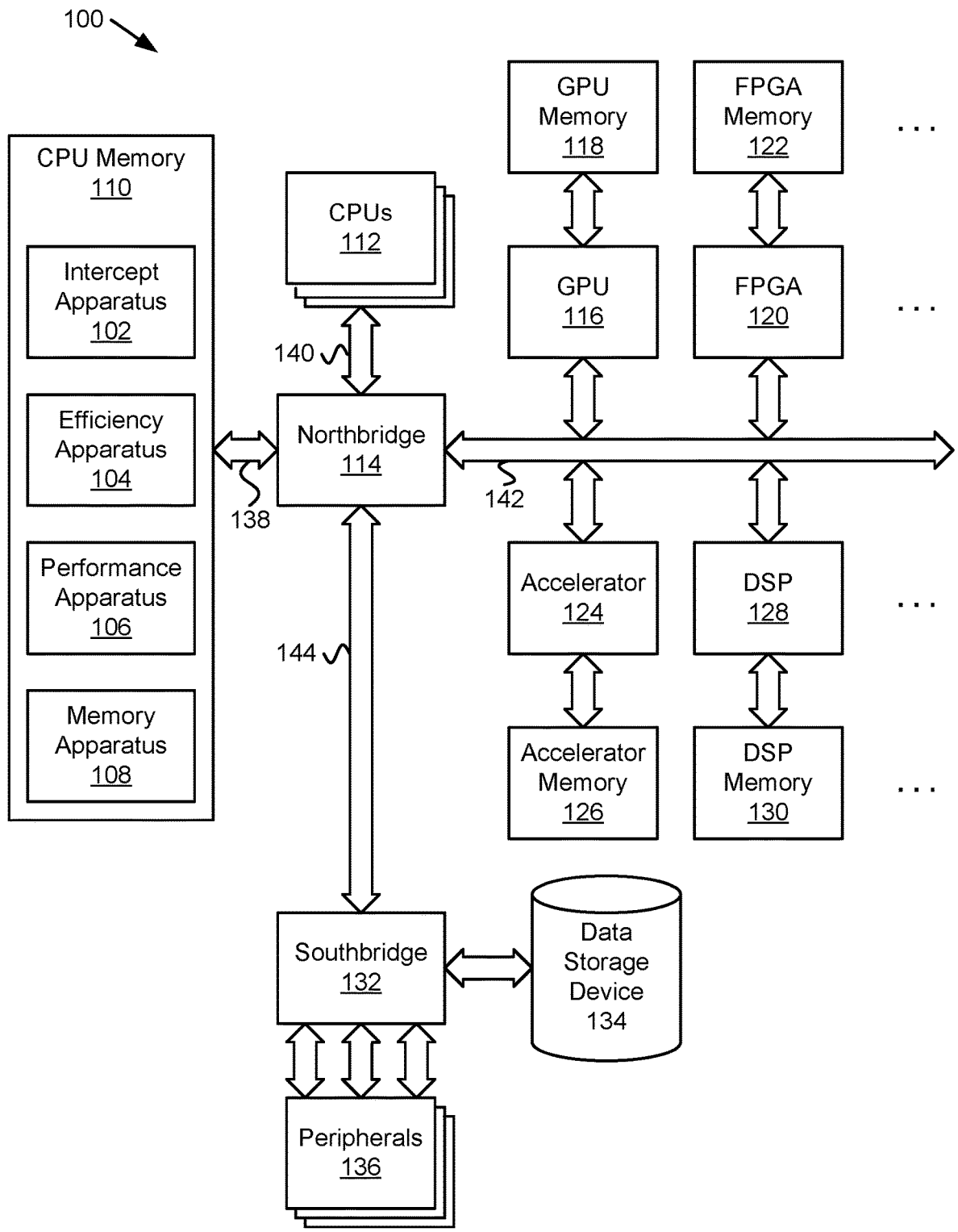
FIG. 1 is a schematic block diagram illustrating one embodiment of a system for selecting a processor for executing a function call.

As will be appreciated by one skilled in the art, aspects of the embodiments may be embodied as a system, method or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, comprise one or more physical or logical blocks of executable code which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory ("RAM"), a read-only memory ("ROM"), an erasable programmable read-only memory ("EPROM" or "Flash memory"), a portable compact disc read-only memory ("CD-ROM"), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. These code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which comprises one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

FIG. 1 depicts a schematic block diagram illustrating one embodiment of a system 100 for selecting a processor for executing a function call. The system includes an intercept apparatus 102, an efficiency apparatus 104, a performance apparatus 106, and a memory apparatus 108 in a central processing unit ("CPU") memory 110, one or more CPUs 112, a northbridge 114, a graphics processing unit ("GPU") 116, a GPU memory 118, a field-programmable gate array ("FPGA") 120, an FPGA memory 122, an accelerator 124, an accelerator memory 126, a digital signal processor ("DSP"), a DSP memory 130, a southbridge 132, one or more data storage devices 134, one or more peripherals 136, a memory bus 138, a frontside bus ("FSB") 140, a high-speed bus 142, and an internal bus 144, which are described below.

In one embodiment, the system 100 includes an intercept apparatus 102 that dynamically intercepts a function call from an executing application, selects a function from several available functions, and reroutes the function call to the selected function. The intercept apparatus 102 is described in more detail with regard to the apparatuses 200, 300 of FIGS. 2 and 3.

In one embodiment, the system 100 includes an efficiency apparatus 104 that compares energy consumption characteristics of several processors available for execution of a function where the energy consumption characteristic varies based on function size, selects, based on size of the function, a processor with a lowest energy consumption, and executes the function on the selected processor. The efficiency apparatus 104 is described in more detail with regard to the apparatuses 700, 800 of FIGS. 7 and 8.

In another embodiment, the system 100 includes a performance apparatus 106 that compares performance characteristics of several processors available for execution of a function where the performance characteristics vary based on function size, that selects, based on the size of the function, a processor for execution of the function, and that executes the function on the selected processor. The performance apparatus 106 is described in more detail with regard to the apparatuses 1300, 1400 of FIGS. 13 and 14.

In another embodiment, the system 100 includes a memory apparatus 108 that determines memory parameters of host memory and device memory prior to executing a function, selects a memory management method based on the memory parameters, and implements the selected memory management method in association with execution of the function. The memory apparatus 108 is described in more detail with regard to the apparatuses 1800, 1900 of FIGS. 18 and 19.

The system 100 includes CPU memory 110 that includes, in one embodiment, the intercept apparatus 102, the efficiency apparatus 104, the performance apparatus 106, and the memory apparatus 108. While the apparatuses 102, 104, 106, 108 are depicted in the CPU memory 110, one of skill in the art will recognize that all or a portion of the apparatuses 102, 104, 106, 108 may be located elsewhere in the system 100 and may include hardware circuits. The apparatuses 102, 104, 106, 108 may be implemented in one or more hardware circuits, programmable logic devices, and/or executable code stored on computer readable storage media.

The CPU memory 110 may be a single memory as depicted or may include multiple memory types, levels, etc. For example, each CPU 112 may have a separate CPU memory 110 and the system 100 may also share another CPU memory 110. In one embodiment, the CPU memory 110 connects to the one or more CPUs 112 over a memory bus 138 through the northbridge 114. One of skill in the art will recognize other forms of CPU memory 110.

The system 100, in one embodiment, includes a northbridge 114 in communication with the CPUs 112, the CPU memory 110, as well as available processors, such as a GPU 116, an FPGA 120, an accelerator 124 and a DSP 128. The northbridge 114 may also be in communication with a southbridge 132 as well as other elements of the system 100 that are not shown. The northbridge 114, in one embodiment, the northbridge 114 includes a chipset and connects directly to the one or more CPUs 112 and CPU memory 110 over a frontside bus ("FSB") 140 and typically communicates at a speed higher than other components connected to the southbridge 132. The northbridge 114, in one embodiment, facilitates connection to alternate processors 116, 120, 124, 128 available to execute a function, such as the GPU 116, accelerator 124, etc. Typically, the northbridge 114 connects to the alternate processors 116, 120, 124, 128 over one or more high-speed busses 142. The high-speed busses 142 may include a Peripheral Component Interconnect Express ("PCI Express®" or "PCIe") bus, an Accelerated Graphics Port ("AGP"), etc.

In one embodiment, one or more alternate processors 116, 120, 124, 128 are collocated with the one or more CPUs 112. In another embodiment, one or more alternate processors 116, 120, 124, 128 are located remote from the CPUs 112. While a single GPU 116, FPGA 120, accelerator 124 and DSP 128 are depicted in FIG. 1, one of skill in the art will recognize other configurations that may include more or less of each processor type where one or more of the alternate processors 116, 120, 124, 128 are collocated with the CPUs 112 and/or one or more of the alternate processors 116, 120, 124, 128 are remote from the CPUs 112.

Where an alternate processor (e.g. the FPGA 120) is remote from the CPUs 112, the alternate processor may be connected over a network or a high-speed bus 142. The network may include one or more of a local area network ("LAN"), a wide area network ("WAN"), the Internet, a wireless network, a fiber optic network, etc. The network may be connected in various ways, such as through the southbridge 132 over a network interface card.

The wireless network may be a mobile telephone network. The wireless network may also employ a Wi-Fi network based on any one of the Institute of Electrical and Electronics Engineers ("IEEE") 802.11 standards. Alternatively, the wireless network may be a BLUETOOTH® connection. In addition, the wireless network may employ a Radio Frequency Identification ("RFID") communication including RFID standards established by the International Organization for Standardization ("ISO"), the International Electrotechnical Commission ("IEC"), the American Society for Testing and Materials® (ASTM®), the DASH7™ Alliance, and EPCGlobal™.

Alternatively, the wireless network may employ a ZigBee® connection based on the IEEE 802 standard. In one embodiment, the wireless network employs a Z-Wave® connection as designed by Sigma Designs®. Alternatively, the wireless network may employ an ANT® and/or ANT+® connection as defined by Dynastream® Innovations Inc. of Cochrane, Canada.

The wireless network may be an infrared connection including connections conforming at least to the Infrared Physical Layer Specification ("IrPHY") as defined by the Infrared Data Association® (IrDA®). Alternatively, the wireless network may be a cellular telephone network communication. All standards and/or connection types include the latest version and revision of the standard and/or connection type as of the filing date of this application.

As depicted for the alternate processors 116, 120, 124, 128, the GPU 116 is in communication with GPU memory 118, the FPGA 120 is in communication with FPGA memory 122, the accelerator 124 is communication with accelerator memory 126 and the DSP 128 is in communication with the DSP memory 130. In alternate embodiments, one or more of the alternate processors 116, 120, 124, 128 do not include memory and rely on the CPU memory 110 or other memory. For example, a GPU 116 may not include memory and may rely on the CPU memory 110.

The GPU 116, in one embodiment, is capable of executing graphical display commands to drive an electronic display (not shown), but is also capable of executing other functions. For example, the GPU 116 may be a general purpose GPU ("GPGPU") capable of executing functions in addition to execution of typical graphics commands. In one embodiment, the GPU 116 supports a language that facilitates execution of various functions. For example, the GPU 116 may support application program interface ("API") extensions to the C programming language, such as CUDA® from Nvidia® Corporation and OpenCL® from Apple® Corporation.

The FPGA 120 may be configured to perform complex combinational functions and may be specifically designed for specific function types. The FPGA 120, for example, may be designed for computationally intensive functions and may, by their nature, be faster than the CPUs 112 for certain functions, or may be more power efficient for certain functions than the CPUs 112.

The DSP 128 may be included in the system 100 and may include an architecture optimized for the operational needs of digital signal processing functions. The DSP 128 may measure, filter and/or compress analog signals. The DSP 128 may also be used for execution of certain functions and may be more efficient or faster for execution of a particular function than the CPUs 112 or other of the alternate processors 116, 120, 124.

The accelerator 124 may include hardware acceleration to perform some functions faster than the CPUs 112 or other of the alternate processors 116, 120, 128. In some embodiments, an accelerator 124 may be a general category that includes a GPU 116, a DSP 128, etc. or may be designed for some other hardware acceleration tasks. An accelerator 128 may be designed for computationally intensive software code. One of skill in the art will recognize other features and advantages of various types of alternate processors 116, 120, 124, 128 and will recognize other types of alternate processors 116, 120, 124, 128 that may be used for execution of a function.

Each of the alternate processors 116, 120, 124, 128 is capable of executing a function. For example, an executing program may issue a function call and the intercept apparatus 102 may intercept the function call and may determine which of the available alternate processors 116, 120, 124, 128 is capable of executing the function and may determine a best choice for executing the function. Determining which of the alternate processors 116, 120, 124, 128 to select may be made based on power efficiency, performance, workload, etc. A particular function call may select a function and a processor for executing the function. In one embodiment, the intercept apparatus 102 intercepts the function call and determines dynamically which of the alternate processors 116, 120, 124, 128 is a best choice for execution of the function, which may be a different processor than coded into the function call.

The system 100, in one embodiment, includes a southbridge 132 connected to the northbridge 114 over an internal bus 144. The southbridge 132 may include a chipset that includes functionality to connect to peripherals 136, data storage devices 134, and the like. The southbridge 132 may connect using various connection types, such as a universal serial bus ("USB"), a parallel ATA bus, a serial ATA bus, an IEEE 1394 bus, and the like. One of skill in the art will recognize equipment that may connect over a southbridge 132 and connection types.

Figure 2:
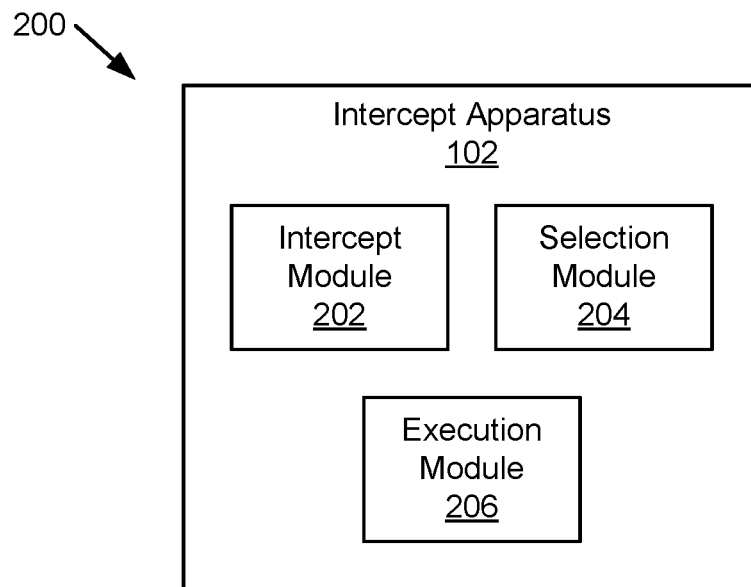
FIG. 2 is a schematic block diagram illustrating one embodiment of an apparatus for intercepting a function call.

FIG. 2 is a schematic block diagram illustrating one embodiment of an apparatus 200 for intercepting a function call. The apparatus 200 includes one embodiment of the intercept module 202 that includes an intercept module 202, a selection module 204, and an execution module 206, which are described below. While the modules 202, 204, 206 are depicted in the intercept apparatus 102, in some embodiments, some or all of the modules 202, 204, 206 may be located elsewhere and may be implemented in various ways, such as hardware circuits, executable code, etc. and may be implemented using a combination of executable code combined with hardware circuits.

The apparatus 200, in one embodiment, includes an intercept module 202 that intercepts a function call from an executing application. The function call, in one embodiment, specifies a target function where the target function is associated with a target processor. For example, the target processor may be a CPU 112 or an alternate processor 116, 120, 124, 128.

Typically, a function call is a static call where the function is specified along with various other parameters for execution. As part of the static function call, the target processor is specified. However, the target processor may not be the best choice for execution of the function in terms of some desired criteria, such as low power operation, performance, etc. The intercept module 202 dynamically intercepts the function call during execution of the program making the function call. In one embodiment, the function call is a static call with an environment variable that references the target function and the intercept module 202 halts reading of the environment variable to determine the target function and substitutes a function call that includes the selection module 204 and/or the execution module 206 to substitute the selected function for execution of the function call. For example, the substitute function call may call the selection module 204 and/or the execution module 206, which may then select an alternate function to execute in place of the function specified in the original function call.

As used herein, intercepting the function call refers to halting execution of the function after the function call but before execution of the function rather than allowing execution of the function to proceed as intended without determining if another processor would be a better choice for satisfying the function call. In one embodiment, intercepting the function call includes halting execution of the function call while the selection module 204 and the execution module 206 act to select and execute a function, as described below.

The apparatus 200, in one embodiment, includes a selection module 204 that selects a function from a plurality of available functions to execute the function call. In one embodiment, each available function is associated with a separate processor (e.g. 112, 116, 120, 124, 128). In other embodiments, each processor 112, 116, 120, 124, 128 is capable of executing particular functions where the functions may overlap processors. For example, a CPU 112 may be able to execute a particular type of fast Fourier transform ("FFT") function while the GPU 116 and accelerator 124 may also be capable of execution of the same function or same function type. The selection module 204 may select between FFT functions for the CPU 112, the GPU 116 and the accelerator 124 to select a function and associated processor that is most appropriate for meeting certain execution goals.

Other types of functions may include a mathematical function, linear regression, a lower level matrix operation, performing a neural network evaluation, performing a convolutional operation, and the like. One of skill in the art will recognize other functions that may be subject of a function call.

In one embodiment, the selection module 204 determines characteristics of the function call and uses the characteristics of the function call to select a function for execution of the function call. For example, the characteristics of the function call may include size of the function, context, function type, runtime variables, and the like. The selection module 204 may then use characteristics of the function call to determine which function and associated processor is best suited for satisfying the function call.

In another embodiment, the selection module 204 selects the selected function based on selection of a function of the plurality of available functions projected to have a highest performance based on characteristics of the function call. For example, for a particular function that processes complex linear algebra functions as well as sizes of matrices in the function call, a projected number of matrix operations, etc., the selection module 204 may select a function and associated processor that minimizes power consumption for that particular function call.

In another embodiment, the selection module 204 selects the selected function based on selection of a function of the plurality of available functions projected to have a highest performance based on characteristics of the function call. For example, execution of a particular function based on characteristics of the function call may be faster than execution of a similar function on a different available processor and the selection module 204 may select the function that executes fastest.

In another embodiment, the selection module 204 selects the selected function based on current loading and/or a projected loading of each processor associated with each of the plurality of available functions. For example, the selection module 204 may assess current operating status of each available processor 112, 116, 120, 124, 128 and may determine that one or more of the available processors 112, 116, 120, 124, 128 is busy executing another function or program. Status of each of the available processors 112, 116, 120, 124, 128 may be a factor along with other criteria, such as maximum efficiency, maximum performance, etc. when selecting a function or may be a factor that eliminates a function. For example, an available processor (e.g. the GPU 116) may be executing a function when the intercept module 202 intercepts the function call. The selection module 204 may estimate a completion time of execution of a function that will satisfy the function call by adding estimated execution time of the function plus execution of the currently executing function.

In one embodiment, the selected function selected by the selection module 204 differs from the target function. For example, the target function may be scheduled to execute on the CPU 112 while the selected function executes on the DSP 128. In another embodiment, the selection module 204 determines that the target function is most appropriate and the target function becomes the selected function so that the function call executes as originally stated.

The apparatus 200, in one embodiment, includes an execution module 206 that reroutes the function call to execute the selected function. The execution module 206 typically reroutes the function call so that the selected function executes on an associated processor. For example, the selected function may execute on the GPU 116 instead of one of the CPUs 112 so that the execution module 206 reroutes the function call to execute the selected function on the GPU 116. For instance, the function call may specify a function on one of the CPUs 112 that includes linear regression and the selected function also includes linear regression so that execution of the function on the GPU 116 using parameters of the function call generates similar or identical results as the function that would have executed on the selected CPU 112.

The execution module 206 rerouting the function call may include substituting the selected function and associated parameters in place of the target function and associated parameters in the function call. In another embodiment, the execution module 206 controls execution of the selected function, for example by issuing one or more commands to the processor associated with the selected function. In another embodiment, the execution module 206 returns results of the executed function to the executing program. One of skill in the art will recognize other functions of the execution module 206 for executing the selected function in place of the target function.

Figure 3:
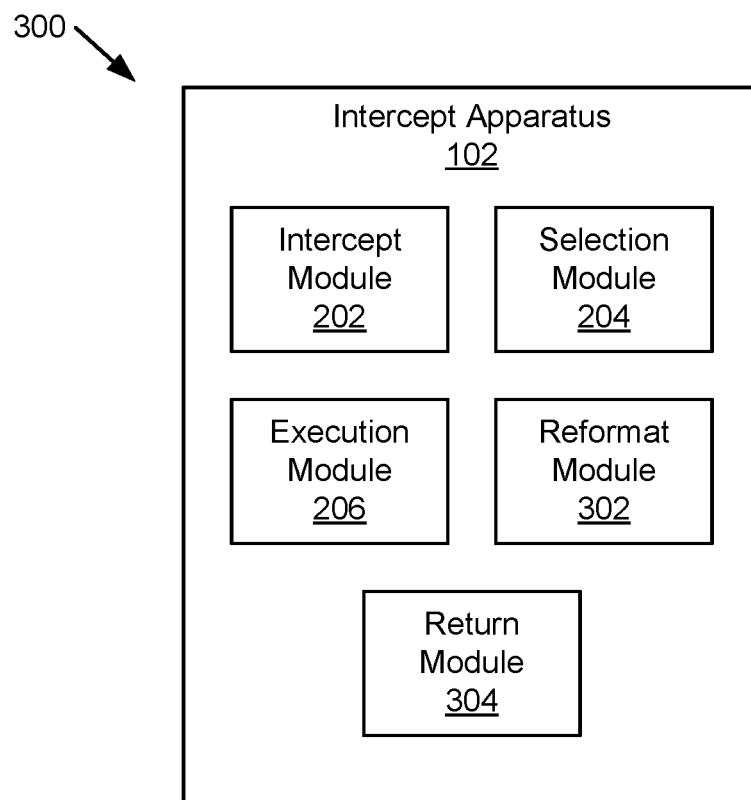
FIG. 3 is a schematic block diagram illustrating one embodiment of an alternate apparatus for intercepting a function call.

FIG. 3 is a schematic block diagram illustrating one embodiment of an alternate apparatus 300 for intercepting a function call. The apparatus 300 includes another embodiment, of the intercept apparatus 102 with an intercept module 202, a selection module 204, and an execution module 206 that are substantially similar to those described above in relation to the apparatus 200 of FIG. 2. In some embodiments, the apparatus 300 also includes a reformat module 302 and/or a return module 304, which are described below.

In one embodiment, the function call is formatted for execution of the target function on the processor associated with the target function. For example, the function call may be formatted for execution on one of the CPUs 112. In the embodiment, the apparatus 300 includes a reformat module 302 that reformats the function call for execution of the selected function on the processor associated with the selected function. For example, the selected function may execute on the GPU 116 and the reformat module 302 reformats the function call to call the selected function for execution on the GPU 116. The reformat module 302, for example, may adjust parameters, variables, executable code, and the like so that the selected function executes and provides the same results or similar results to results that would have been produced by executing the target function.

In another embodiment, the apparatus 300 includes a return module 304 that formats results from the selected function in a format compatible with a format of results from the target function and returns the results to the application. For example, if the selected function executes on the GPU 116, results may be in a format different than from the target function and the return module 304 may reformat the results from the selected function so that results returned in response to the function call are in an expected format.

The reformat module 302 and the return module 304 beneficially allow a user to format a function with a standard format, for example, in a format for one of the CPUs 112 and then the apparatus 300 is able to select a different function and associated processor without the user being required to reformat the function call.

Figure 4:
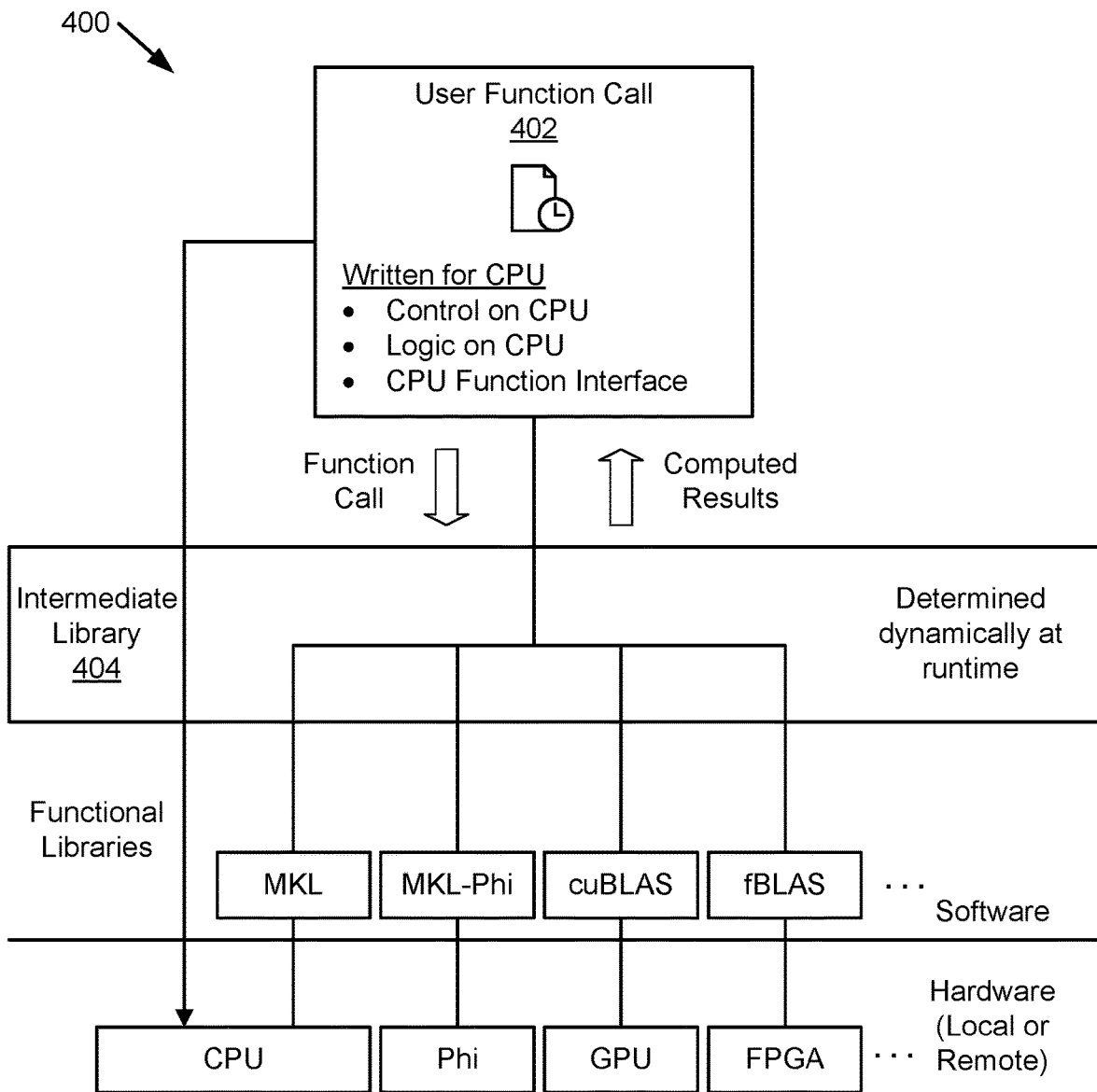
FIG. 4 a schematic flow chart diagram illustrating one embodiment of a method for intercepting and rerouting a function call for execution.

FIG. 4 is a schematic flow chart diagram illustrating one embodiment of a method 400 for intercepting and rerouting a function call for execution. The flow chart 400 graphically illustrates a function call 402 that is written for a CPU (e.g. 112) that can be controlled on the CPU and can use the CPU interface. The apparatuses 200, 300 of FIGS. 2 and 3 may dynamically intercept the function call 402 at runtime and may then select an available function from the intermediate library 404.

Any number of available functions may substitute for the target function. As depicted, some libraries may include a Math Kernel Library ("MKL") that may include core math functions, sparse solvers, FFTs, vector math, etc. In one embodiment, functions from the MKL library may run on one or more of the CPUs 112. In another embodiment, an MKL library may be included for execution on a different processor, such as an accelerator 124, which may include an Intel® Xeon Phi™ coprocessor (depicted in FIG. 4 as "Phi"). In another embodiment, the selection module 204 may select a function from a graphical processor library, such as the NVIDA® CUDA® Basic Linear Algebra Subroutines ("cuBLAS") library or similar library, for execution on the GPU 116.

In another embodiment, the selection module 204 selects a function from a library for the FPGA 120, such as the FPGA Basic Linear Algebra Subroutines ("fBLAS") library for execution on the FPGA 120. The libraries and associated processors depicted in FIG. 4 are merely for illustration and one of skill in the art will recognize that other alternate processors and processor types may be available for execution of a function call and that other function libraries may be available.

Figure 5:
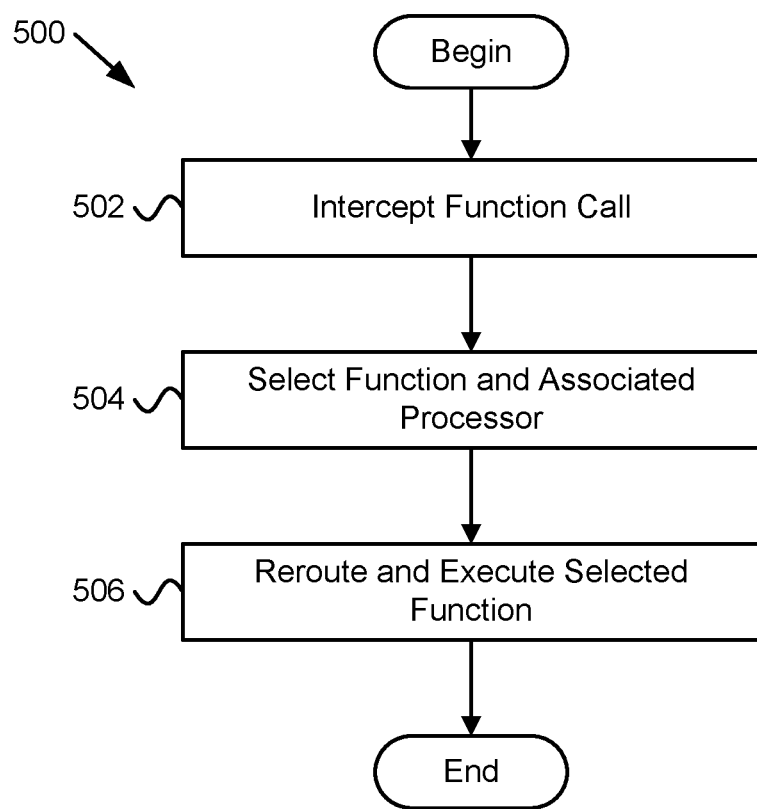
FIG. 5 is a schematic flow chart diagram illustrating one embodiment of a method for intercepting a function call.

FIG. 5 is a schematic flow chart diagram illustrating one embodiment of a method 500 for intercepting a function call. The method 500 begins and intercepts 502 a function call from an executing application. The function call specifies a target function where the target function is associated with a target processor. In one embodiment, the intercept module 202 intercepts 502 the function call. The method 500 selects 504 a function from among several available functions to execute the function call. In one example, the selection module 204 selects 504 a function. In one embodiment, each available function is associated with a separate processor. The method 500 reroutes 506 the function call to execute the selected function, and the method 500 ends. In one embodiment, the execution module 206 reroutes 506 the function call to execute the selected function.

Figure 6:
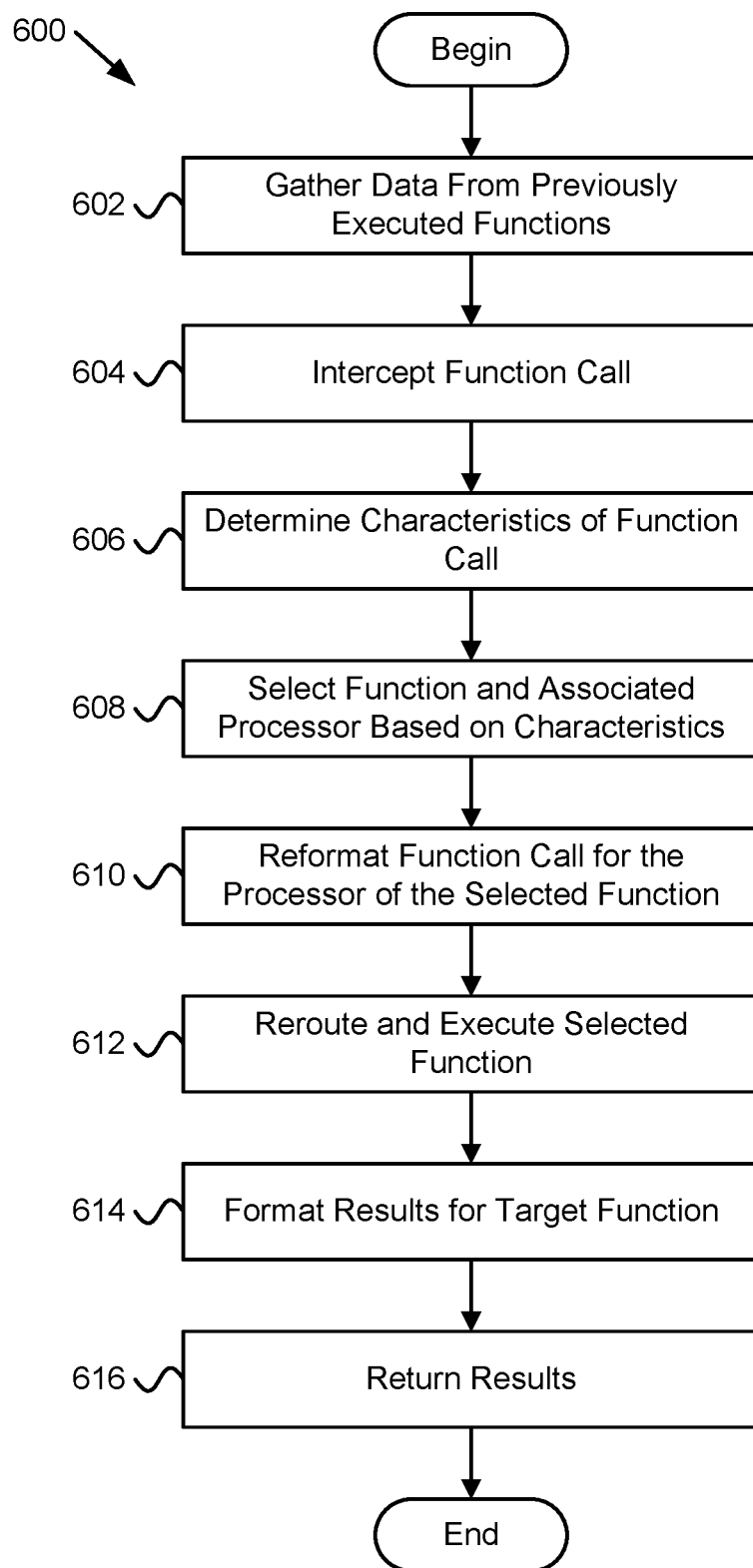
FIG. 6 is a schematic flow chart diagram illustrating one embodiment of an alternate method for intercepting a function call.

FIG. 6 is a schematic flow chart diagram illustrating one embodiment of an alternate method 600 for intercepting a function call. The method 600 begins and gathers 602 data from previously executed functions. For example, the method 600 may gather 602 data from each available processor regarding executed functions. The data may include execution time, context information, function size, energy consumption, and the like.

The method 600 intercepts 604 a function call from an executing application where the function call specifies a target function and the target function is associated with a target processor. The method 600 selects 606 a function from a plurality of available functions to execute the function call, and in one embodiment, each available function is associated with a separate processor. The method 600 determines 608 characteristics of the function call. For example, the method 600 may determine 608 characteristics, such as target function size, target function type, parameters of the target function, and the like. The method 600 selects 608 a function and associated processor based on various conditions, factors, criteria, etc.

For example, the method 600 may use data from previously executed functions to predict execution time, energy efficiency, current load of available processors, etc. for available functions and may then select 608 a function that meets desired criteria, such as lowest energy consumption, best performance, etc. In one embodiment, the selection module 204 determines 606 characteristics of the function call and selects 608 a function based on the characteristics, data from previously executed functions, current processor conditions, etc.

The method 600 reformats 610 the function call for execution of the selected function on the processor associated with the selected function. For example, the reformat module 302 may reformat 610 the function call. The method 600 reroutes 612 the function call to execute the selected function on the processor associated with the selected function and formats 614 results from execution of the selected function in a format compatible with a format of results from the target function and returns 616 the results to the application, and the method 600 ends. In one embodiment, the return module 304 formats 614 results from execution of the selected function and returns 616 results to the application.

Figure 7:
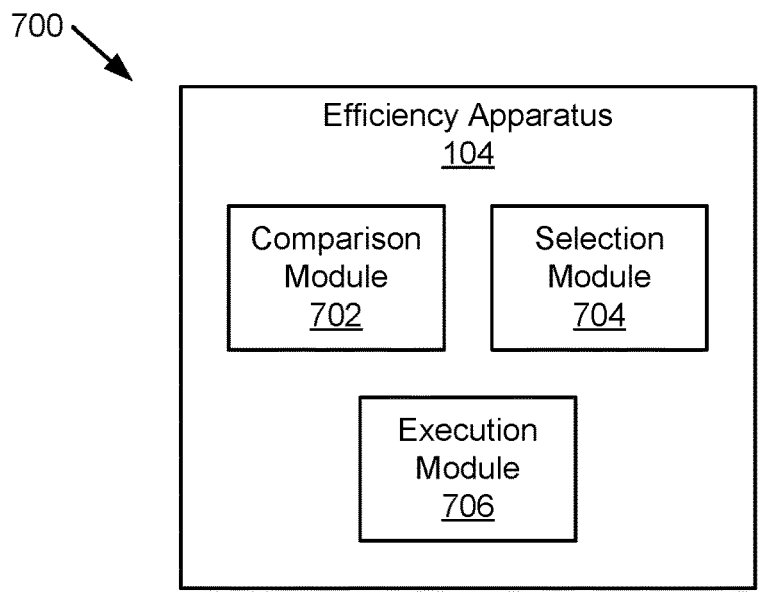
FIG. 7 is a schematic block diagram illustrating one embodiment of an apparatus for determining execution of a function call based on efficiency.

FIG. 7 is a schematic block diagram illustrating one embodiment of an apparatus 700 for determining execution of a function call based on efficiency. The apparatus 700 includes one embodiment of the efficiency apparatus 104 that includes a comparison module 702, a selection module 704, and an execution module 706, which are described below. While the efficiency apparatus 104 is depicted in the CPU memory 110 in FIG. 1 and the modules 702, 704, 706 are depicted in the apparatus 700 in FIG. 7, one of skill in the art will recognize that all or a portion of the modules 702, 704, 706 may be located elsewhere. In addition, the modules 702, 704, 706 may be implemented using hardware circuits, a programmable logic device, executable code, or any combination thereof. For example, the comparison module 702 may include hardware circuits to measure energy consumption or may be implemented in executable code or in a programmable logic device that receives power consumption data. The location and makeup of the modules of the apparatus 700 of FIG. 7 may also apply to the modules 802, 804, 806, 808, 810, 812, 202 of the apparatus 800 of FIG. 8.

In one embodiment, the apparatus 700 includes a comparison module 702 that compares energy consumption characteristics of a plurality of processors available for execution of a function. Each energy consumption characteristic varies as a function of function size. The energy consumption characteristics may be supplied by a vendor, provided by a user, derived from previously executed functions, etc. In one embodiment, the energy consumption characteristic of a processor of the plurality of processors includes a startup cost and energy usage as a function of function size.

Figure 11:
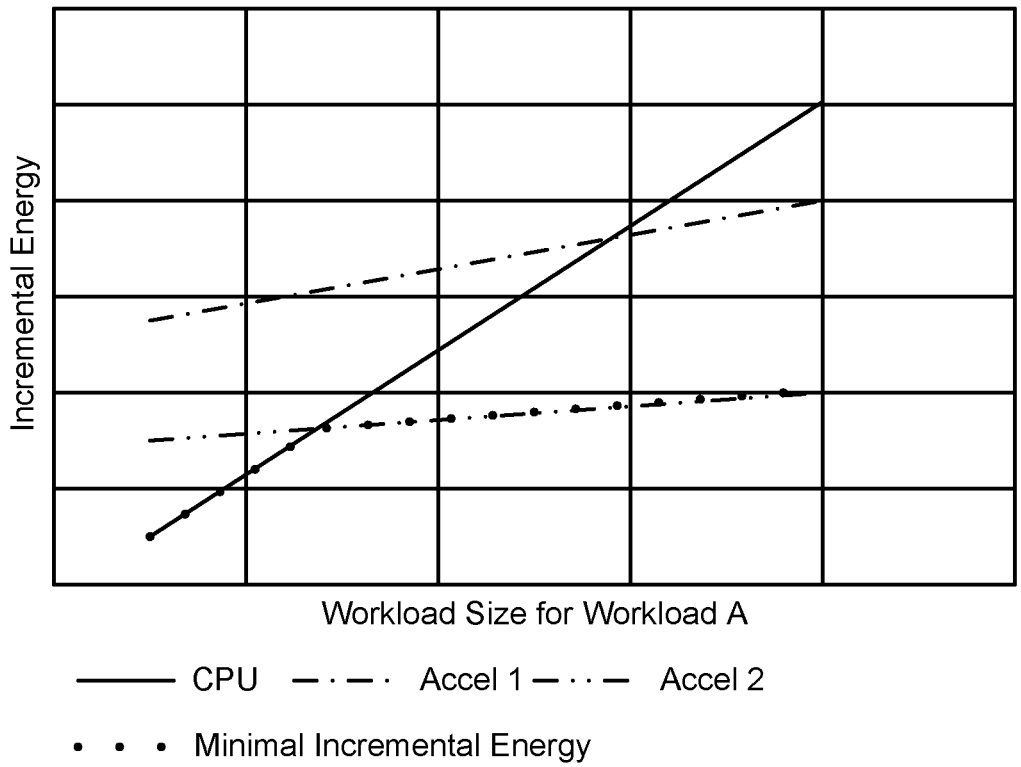
FIG. 11 is a chart depicting one embodiment of incremental energy requirements of three processors based on workload size.
Figure 12:
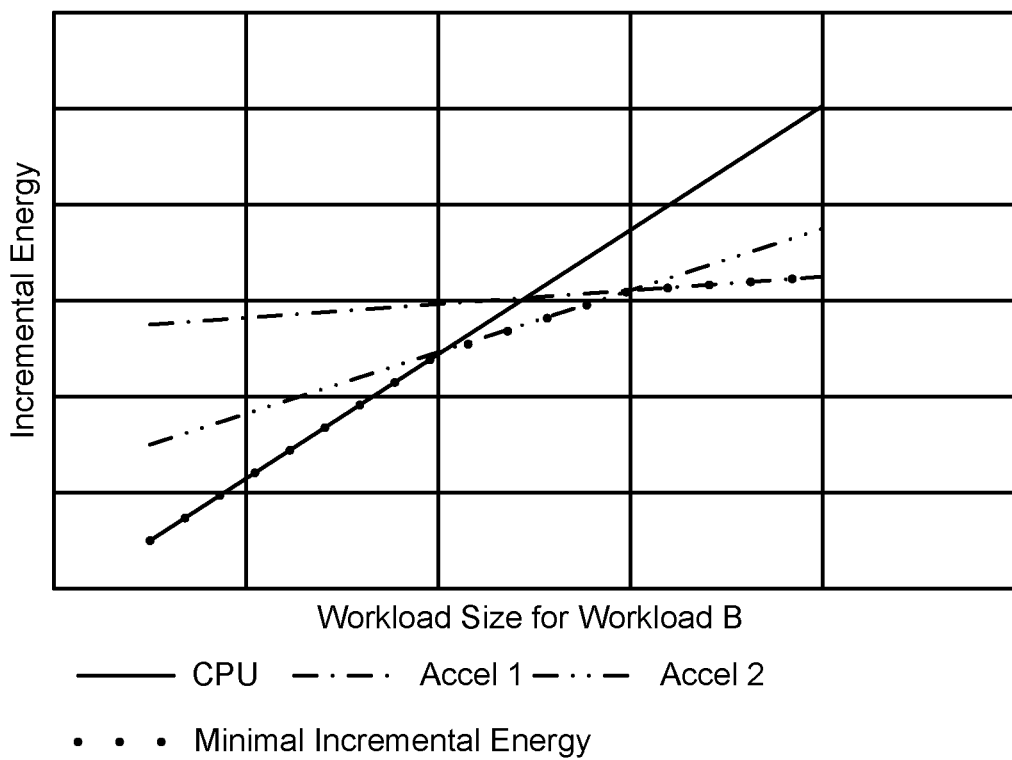
FIG. 12 is a chart depicting another embodiment of incremental energy requirements of three processors based on workload size.

For example, for available processor energy consumption characteristics for an available processor may include an initial startup cost that includes energy consumed as a result of preparing the processor to execute a selected function. The processor energy consumption characteristics may also include energy consumption characteristics for execution of the selected function that vary based on function size. If the processor energy consumption characteristics are expressed graphically, a curve representing the processor energy consumption characteristics may include an initial offset followed by a curve that increases based on function size. FIGS. 11 and 12 are representative graphical representations of the processor energy consumption characteristics of three available processors and are discussed further below.

Typically, the energy consumption of a processor increase as function size increases. Function size may be characterized in various ways and depends on the function type. For example, an FFT function size may be characterized by number of points, a linear algebra function may be characterized by matrix size, number of matrix operations, an object detection function determining a number of objects in a photograph may be characterized by the number of searched objects, number of pixels in a photograph being analyzed, and the like. One of skill in the art will recognize function parameters that may be used to determine function size.

The apparatus 700, in one embodiment, includes a selection module 704 that selects, based on the size of the function, a processor from the plurality of processors with a lowest energy consumption for execution of the function. For example, if a function call for the function to be executed is an FFT function with a particular number of points and the available processors that have an available FFT function are a CPU 112, a GPU 116, and an FPGA 120, the selection module 704 may use energy consumption characteristics of the CPU 112, the GPU 116, and the FPGA 120 to determine which processor is most efficient for the size of the FFT function called out in the associated function call and may the select a function associated with this relatively most efficient processor.

The apparatus 700, in one embodiment, includes an execution module 706 that executes the function on the selected processor. In the example above, if the selection module 704 selects the GPU 116 as the most efficient processor for the FFT function based on the function size called out in the function call, the execution module 706 may execute an FFT function on the GPU 116 based on parameters from the function call.

Figure 8:
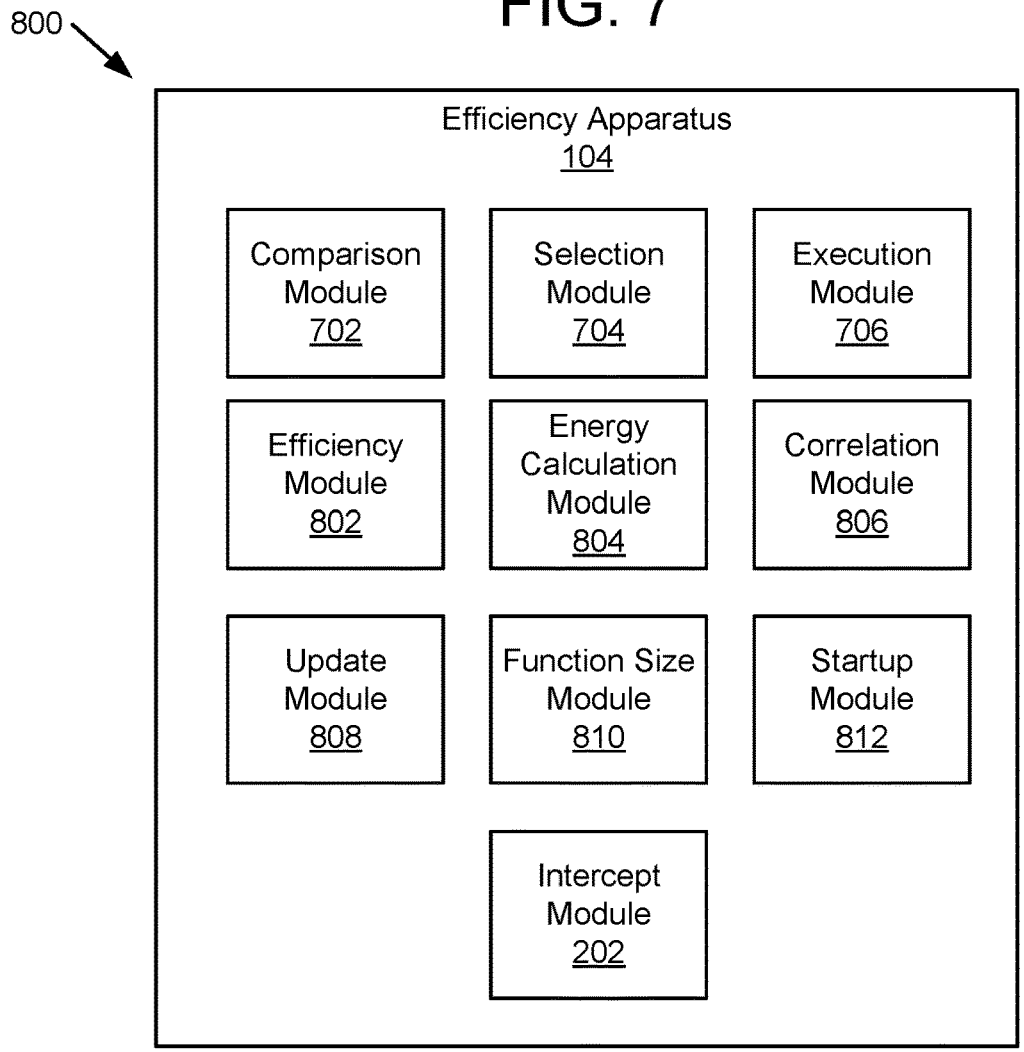
FIG. 8 is a schematic block diagram illustrating one embodiment of an alternate apparatus for determining execution of a function call based on efficiency.

FIG. 8 is a schematic block diagram illustrating one embodiment of an alternate apparatus 800 for determining execution of a function call based on efficiency. The apparatus 800 includes another embodiment of the efficiency apparatus 104 with a comparison module 702, a selection module 704 and an execution module 706, which are substantially similar to those described above in relation the apparatus 700 of FIG. 7. In various embodiments, the efficiency apparatus 104 may also include one or more of an efficiency module 802, an energy calculation module 804, a correlation module 806, an update module 808, a function size module 810, a startup module 812, and an intercept module 202, which are described below. In addition, the selection module 704 and the execution module 706 may include functionality described above in relation to the apparatuses 200, 300 of FIGS. 2 and 3.

The apparatus 800, in one embodiment, includes an efficiency module 802 that determines the energy consumption characteristic of each of the plurality of processors available for execution of the function. For example, the efficiency module 802 may access previously stored energy consumption characteristics or may calculate an energy consumption characteristic based on stored energy consumption data points.

In one embodiment, the efficiency module 802 determines the energy consumption characteristic of each of the plurality of processors based on information supplied with the function. For example, a user may store energy consumption characteristics in a library along with the function or in a location linked to the function. In another embodiment, the efficiency module 802 determines the energy consumption characteristic of each of the plurality of processors based on information from a vendor. For example, a vendor associated with a function or library of functions that executes on a processor 112, 116, 120, 124, 128 or a vendor associated with a processor 112, 116, 120, 124, 128 may provide energy consumption characteristics associated with a function of a particular processor. The efficiency module 802 may access the vendor supplied energy consumption characteristics.

In another embodiment, the efficiency module 802 determines the energy consumption characteristic of each of the plurality of processors based on function execution data from previously executed functions. The efficiency module 802 may access the execution data and then use the execution data directly or may calculate energy consumption characteristics for a processor based on the execution data.

In another embodiment, the apparatus 800 includes an energy calculation module 804 that calculates energy consumption of an executed function executed on a processor of the plurality of processors and a correlation module 806 that correlates a size of each executed function to energy consumed during execution of the function to determine the energy consumption characteristic of the processor. For example, the energy calculation module 804 may determine current, voltage, power, execution time, number of executed operations or other metric useful in determining energy consumption and that may be associated with a processor executing a function and then the calculation module 804 may use this information to calculate energy consumption of the executed function.

The correlation module 806 may then determine function size for the executed function and may then correlate this function size with the calculated energy consumption and may also correlate the executed function and associated processor with the function size and calculated energy consumption. The comparison module 702 may then use data provided by the efficiency module 802, the energy calculation module 804 and/or the correlation module 806 when comparing energy consumption characteristics of available processors (e.g. 112, 116, 120, 124, 128).

In one embodiment, energy consumption characteristics of available processors are initially provided by a user, vendor, etc. but may be updated with data from executed functions. In one embodiment, the apparatus 800 may include an update module 808 that updates an initial energy consumption characteristic of a processor based on the function execution data from the previously executed functions.

In one embodiment, the update module 808 updates energy consumption characteristics incrementally. For example, after a function is first executed, only a single point is available for the update module 808 to use to update initial energy consumption characteristics and the initial energy consumption characteristics may be used for most points along an energy consumption curve. Over time, additional data from executed functions may replace initial energy consumption characteristics from a vendor or user partially or fully. The update module 808 may use curve fitting, extrapolation, or other techniques to estimate energy consumption between data points from executed functions and/or initial energy consumption characteristics.

In another embodiment, the update module 808 replaces initial energy consumption characteristics after execution of multiple functions when execution data is sufficient to establish new energy consumption characteristics so that the initial energy consumption characteristics are based on data from one or more executed functions instead of vendor or user supplied data. For example, the update module 808 may replace an entire initial energy consumption characteristic curve from a vendor or user with a new curve based on data from executed functions. In another embodiment, the update module 808 replaces a section of data with data from executed functions. For example, the update module 808 may replace a section of initial energy consumption characteristics from a vendor or user within a range of function sizes. One of skill in the art will recognize other ways for the update module 808 to update initial energy consumption characteristics with data from function execution data of previously executed functions.

In one embodiment, the apparatus 800 includes a function size module 810 that determines a size of the function. For example, the function size module 810 may evaluate parameters, data, etc. called out or referenced in a function call to determine the size of the function. In some embodiments, the function size module 810 determines the size of the function based on a size of input data of the function, a number of operations to be performed in executing the function, a number of times one or more functions are called during execution of the function, a number of items searched for during execution of the function, and the like. The comparison module 702 may then use the function size to determine energy consumption characteristics associated with the particular function size for the available processors.

In some embodiments, the energy consumption characteristic of a processor of the plurality of processors includes a startup cost and energy usage as a function of function size. For a particular function, the startup cost includes an amount of energy to bring the processor to a state ready to execute the function. Beyond the startup cost, energy consumption for the function typically varies with function size. In looking at a curve expressing an energy consumption of a function, an initial offset may represent the startup cost and the slope and nature of the curve beyond the initial offset may represent change in energy consumption of the processor varying with function size.

In one embodiment, the apparatus 800 includes a startup module 812 that determines a current state of the processor that will execute the function and that adjusts the startup cost for the processor based the current condition of the processor. For example, at the time of the function call, an available processor may be in various states. For example, the processor may be in a dormant state, which may require a relatively large amount of energy to reach a state where the processor is ready to execute the function or the processor may be just completing execution of another function and may be in a ready state or a state that requires a relatively small amount of energy to reach the ready state. The startup module 812 may then determine a current startup cost. For example, a current startup cost may shift an energy consumption characteristic curve up or down. One of skill in the art will recognize other ways for the startup module 812 to update startup cost of a processor available to execute a function.

In one embodiment, the apparatus 800 includes an intercept module 202 that intercepts a function call from an executing application where the function call specifies a target function and the target function is associated with a target processor. The intercept module 202, in one embodiment, is substantially similar to the intercept modules 202 of the apparatuses 200, 300 of FIGS. 2 and 3. In the embodiment, the comparison module 702 compares energy consumption characteristics of the plurality of processors in response to the intercept module 202 intercepting the function call.

In addition, the selection module 704 selects a function from a plurality of available functions to execute the function call where each function is associated with a separate processor. The selection module 704 selects the function associated with the processor with a lowest energy consumption for execution of the function call. Also in the embodiment, the execution module 706 reroutes the function call to execute the selected function. In the embodiment, the selection module 704 may be similar to or the same as the selection module 204 and the execution module 706 may be similar to the execution module 206 described in the apparatuses 200, 300 of FIGS. 2 and 3 and the selection module 704 and the execution module 706 includes functionality described with regard to the apparatuses 700, 800 of FIGS. 7 and 8 where selection criteria for a function is specified to select a most energy efficient processor.

Figure 9:
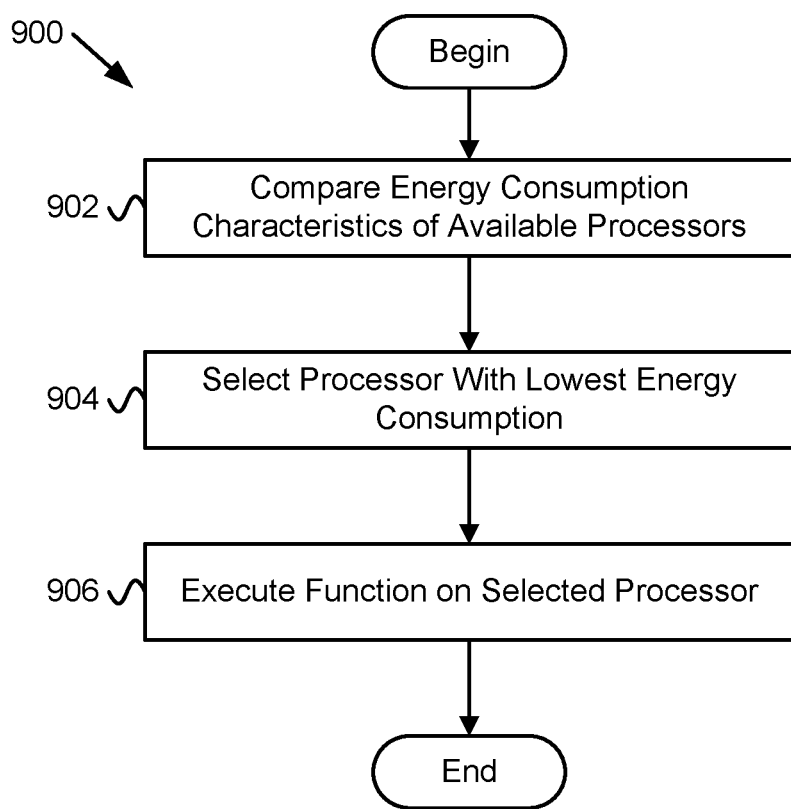
FIG. 9 is a schematic flow chart diagram illustrating one embodiment of a method for determining execution of a function call based on efficiency.

FIG. 9 is a schematic flow chart diagram illustrating one embodiment of a method 900 for determining execution of a function call based on efficiency. The method 900 begins and compares 902 energy consumption characteristics of a plurality of processors available for execution of a function, where each energy consumption characteristic varies as a function of function size. In one embodiment, the comparison module 702 compares 902 energy consumption characteristics.

The method 900 selects 904, based on the size of the function, a processor from the plurality of available processors 112, 116, 120, 124, 128 with a lowest energy consumption for execution of the function and executes 906 the function on the selected processor, for example, on the GPU 116. Typically, the method 900 selects a function for the selected processor (e.g. GPU 116) that is from a library for the selected processor and matches a function of a function call. For example, if a function call specifies an FFT function, the method 900 selects an FFT function a library for the selected processor (e.g. GPU 116). The available processors 112, 116,120, 124, 128 may be limited to those that have an associated function that matches a function specified in a function call. For example, where a function call specifies an FFT, processors that may not have an associated FFT function may not be part of the available processors or may not be selected 904 by the method 900. In some embodiments, the selection module 704 selects 904 a processor and the execution module 706 executes 906 the function.

Figure 10:
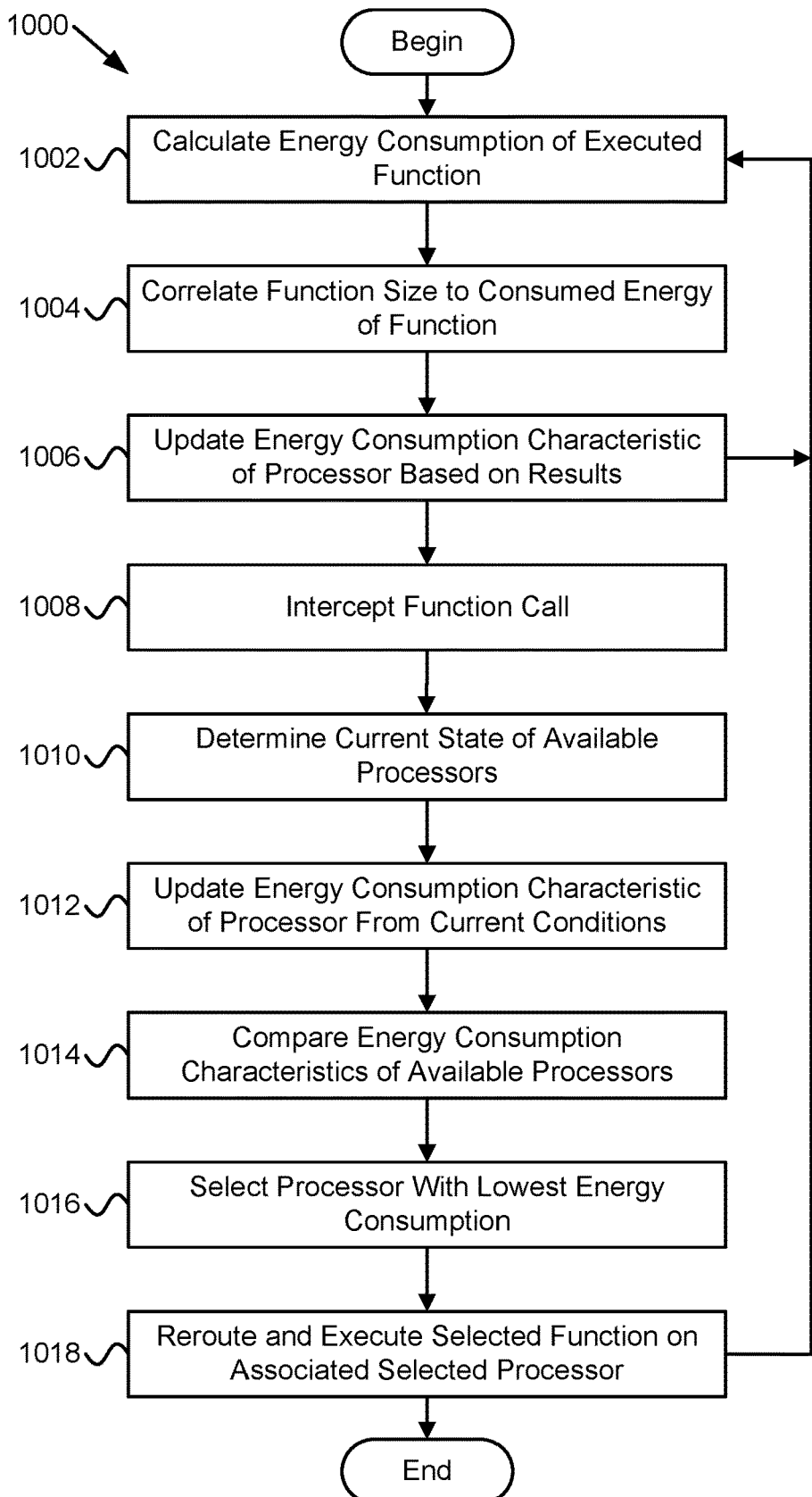
FIG. 10 is a schematic flow chart diagram illustrating one embodiment of an alternate method for determining execution of a function call based on efficiency.

FIG. 10 is a schematic flow chart diagram illustrating one embodiment of an alternate method 1000 for determining execution of a function call based on efficiency. The method 1000 begins and calculates 1002 energy consumption of an executed function executed on a processor of available processors 112, 116, 120, 124, 128 and correlates 1004 a size of each executed function to energy consumed during execution of the function to determine the energy consumption characteristic of the processor. The method 1000 updates 1006 an initial energy consumption characteristic of a processor based on the function execution data from the previously executed functions. For example, the method 1000 updates an initial energy consumption characteristic of a processor that includes data from executed functions, from user supplied data, and/or vendor supplied data.

The method 1000 may repeat calculating 1002 energy consumption of an executed function and correlating 1004 a size of each executed function to energy consumed during execution of the function and updating 1006 energy consumption characteristics each time a function executes on one of the available processors 112, 116, 120, 124, 128. In some embodiments, the energy calculation module 804 calculates 1002 energy consumption of an executed function and the correlation module 806 correlates 1004 a size of each executed function to energy consumed during execution of the function to determine the energy consumption characteristic of the processor. In addition, the update module 808 may update 1006 an initial energy consumption characteristic of a processor or data from an executed function.

The method 1000 intercepts 1008 a function call from an executing application where the function call specifies a target function and the method 1000 determines 1010 a current state of the processor and adjusts the startup cost for the processor based the current condition of the processor. For example, the method 1000 may determine that a processor is in a state of readiness so that an initial startup cost his higher than a current startup cost and the method 1000 then adjusts the startup cost for the processor. Typically, the method 1000 determines 1010 the current state of available processors and associated functions that are being considered for execution in place of a function specified in a function call. In one embodiment, the startup module 812 determines 1010 the current state of one or more processors and adjusts the startup costs accordingly.

The method 1000 updates 1012 an initial energy consumption characteristic of a processor based on the function execution data from the previously executed functions. The initial energy consumption characteristics may be supplied by a vendor, may be supplied by a user, or may include data from previously executed functions. In one example, the update module 808 updates 1012 initial energy consumption characteristics. The method 1000 compares 1014 energy consumption characteristics of a plurality of processors available for execution of a function where each energy consumption characteristic varies as a function of function size and selects 1016, based on the size of the function, a processor from the plurality of processors with a lowest energy consumption for execution of the function. The comparison module 702 may compare 1014 energy consumption characteristics and the selection module 704 may select 1016 a function. The method 1000 reroutes 1018 the function call to execute the selected function the selected processor, and the method 1000 ends. The execution module 706 may reroute 1018 the function call. In addition, the method 1000 may return after execution of the function to use data from the newly calculated function to calculate 1002 the energy consumption of the executed function.

FIG. 11 is a chart depicting one embodiment of incremental energy requirements of three processors based on workload size. The chart depicts incremental energy on the vertical axis and workload size (i.e. function size) on the horizontal axis. The chart shows an energy consumption characteristic of three available processors: a CPU (e.g. CPU 112), a first accelerator (e.g. accelerator 124), and a second accelerator (i.e. another accelerator 124). Other embodiments may include more available processors. The chart in FIG. 11 depicts the energy consumption characteristic of the CPU as a solid line that has a low startup cost (i.e. initial offset on the left side of the CPU energy consumption characteristic). The CPU energy consumption characteristic then increases at a relatively high rate with respect to the other two accelerators as workload size increases.

The chart depicts the energy consumption characteristic of the first accelerator as a line with long dashes separated by a single dot. The first accelerator energy consumption characteristic has a relatively high startup cost, characterized by a large initial offset to the left of the curve. The first accelerator energy consumption characteristic then increases with load size, but not as quickly as for the CPU energy consumption characteristic. The chart depicts the second accelerator energy consumption characteristic as a dashed line with dashes separated by two dots. While the startup cost for the second accelerator energy consumption characteristic is higher than for the CPU, the slope of the line is less than for the CPU so the second accelerator energy consumption characteristic is less than for the CPU at a certain workload size.

The chart depicts minimum incremental energy as a function of workload size as a dotted line. The minimum incremental energy follows the CPU energy consumption characteristic for smaller workloads and then follows the second accelerator energy consumption characteristic when the second accelerator energy consumption characteristic is smaller than the CPU energy consumption characteristic. The comparison module 702 may use data similar to what is in FIG. 11 to compare the energy consumption characteristics and the selection module 704 may then select a processor with a processor with a lowest energy consumption characteristic. For example, the comparison module 702 may use equations, tables, etc. as energy consumption characteristic input. Note that the update module 808 may update the energy consumption characteristic of each processor based on current conditions.

FIG. 12 is a chart depicting another embodiment of incremental energy requirements of three processors based on workload size. The chart in FIG. 12 is similar to the chart in FIG. 11 except that the energy consumption characteristic of the first and second accelerators differs from the chart in FIG. 11. In the chart of FIG. 12, the minimum incremental energy line follows the CPU energy consumption characteristic for small workloads, then the second accelerator energy consumption characteristic for midrange sized workloads and then the first accelerator energy consumption characteristic for larger workloads. Again, the comparison module 702 may compare the energy consumption characteristics as shown in FIG. 12 and the selection module 704 may then select a processor with a processor with a lowest energy consumption characteristic. Again, the update module 808 may alter the energy consumption characteristics based on current conditions of available processors.

Figure 13:
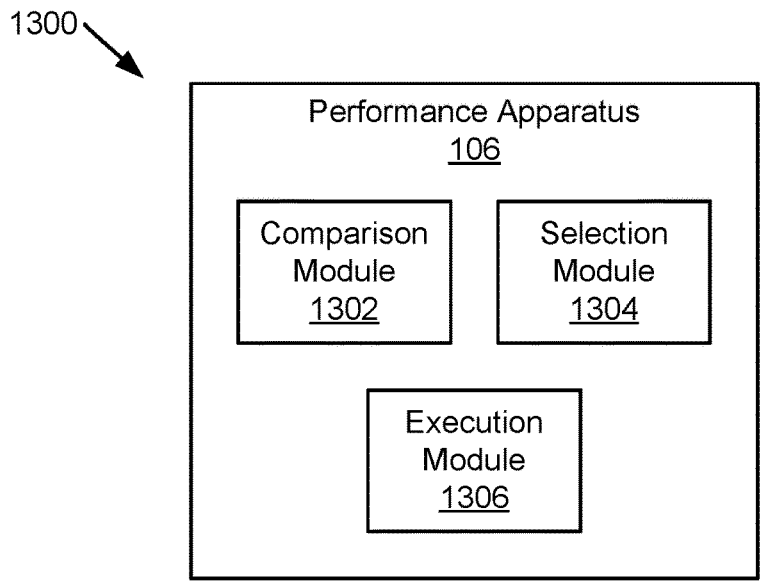
FIG. 13 is a schematic block diagram illustrating one embodiment of an apparatus for determining execution of a function call based on performance.

FIG. 13 is a schematic block diagram illustrating one embodiment of an apparatus 1300 for determining execution of a function call based on performance. The apparatus 1300 includes one embodiment, of the performance apparatus 106 with a comparison module 1302, a selection module 1304, and an execution module 1306, which are described below. While the performance apparatus 106 is depicted in the CPU memory 110 in FIG. 1 and the modules 1302, 1304, 1306 are depicted in the apparatus 1300 in FIG. 13, one of skill in the art will recognize that all or a portion of the modules 1302, 1304, 1306 may be located elsewhere. In addition, the modules 1302, 1304, 1306 may be implemented using hardware circuits, a programmable logic device, executable code, or any combination thereof. For example, the comparison module 1302 may include hardware circuits to measure energy consumption or may be implemented in executable code or in a programmable logic device that receives power consumption data. The location and makeup of the modules of the apparatus 1300 of FIG. 13 may also apply to the modules 1402, 1404, 1406, 1408, 1410, 1412, 202 of the apparatus 1400 of FIG. 14.

The apparatus 1300 includes, in one embodiment, a comparison module 1302 that compares performance characteristics of a plurality of processors available for execution of a function where each performance characteristic varies as a function of function size. For example, the comparison module 1302 may compare performance characteristics of available processors, such as one of the CPUs 112, a GPU 116, an FPGA 120, etc. A performance characteristic, in one embodiment, includes an estimated execution time for a function associated with an available processor, where a shorter execution time may be more desirable than a longer execution time. In other embodiments, a performance characteristic includes other characteristics, such as a measure of affected resources, energy consumption, and the like. In one embodiment, a performance characteristic for a processor includes a combination of various performance metrics. In one embodiment, the selection module 1302 determines a performance characteristic for an available processor (e.g. GPU 116) based on a current condition of the processor. For example, the selection module 1302 may take into account that the GPU 116 is currently executing another function. One of skill in the art will recognize various performance metrics that may be used for a performance characteristic of an available processor.

The apparatus 1300 includes an embodiment of a selection module 1304 that selects, based on a size of the function, a processor from the plurality of processors with a best performance for execution of the function. For example, the comparison module 1304 may determine function parameters, such as function size, function type, etc. from a function call and then compare performance from among available processors, such as one or more of the CPUs 112, the GPU 116, the FPGA 120, etc. and the selection module 1304 may then select the GPU 116 as having the best performance for the function size of all of the available processors 112, 116, 120, 124, 128. The selection module 1304 may be an embodiment of the selection module 204 of the apparatuses 200, 300 of FIGS. 2 and 3.

The apparatus 1300 includes an embodiment of an execution module 1306 that executes the function on the selected processor. For example, if the selection module 1304 determines that the GPU 116 is the selected processor, the execution module 1306 executes an appropriate function on the GPU 116. The function may be from a function library for the GPU 116 and is a replacement for a function called out in a function call. The execution module 1306 may be an embodiment of the execution module 206 in the apparatuses 200, 300 of FIGS. 2 and 3 where the function call is dynamically intercepted during execution of a program.

Figure 14:
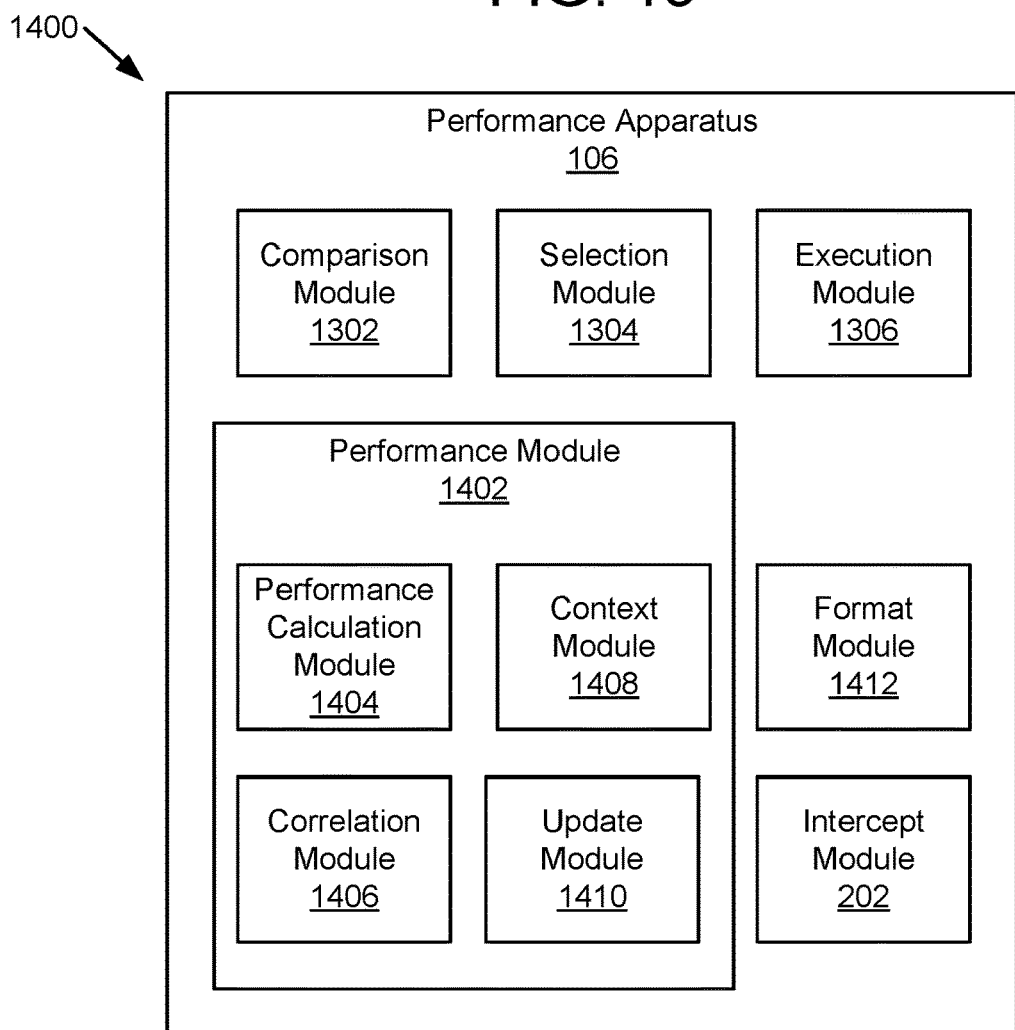
FIG. 14 is a schematic block diagram illustrating one embodiment of an alternate apparatus for determining execution of a function call based on performance.

FIG. 14 is a schematic block diagram illustrating one embodiment of an alternate apparatus 1400 for determining execution of a function call based on performance. The apparatus 1400 includes another embodiment of the performance apparatus 106 which includes a comparison module 1302, a selection module 1304, and an execution module 1306, which are substantially similar to those described above in relation to the apparatus 1300 of FIG. 13. In various embodiments, the apparatus 1400 may also include one or more of a performance module 1402 with a performance calculation module 1404, a correlation module 1406, a context module 1408, and/or an update module 1410, a format module 1412 and an intercept module 202, which are described below.

The apparatus 1400, in one embodiment, includes a performance module 1402 that determines the performance characteristic of each of the plurality of available processors (e.g. 112, 116, 120, 124, 128). For example, the performance module 1402 may evaluate performance of the available processors 112, 116, 120, 124, 128 based on a size of the function specified in a function call. The performance module 1402, in one embodiment, determines the performance characteristic of the available processors 112, 116, 120, 124, 128 based on vendor data, user supplied data, data from previously executed functions, etc.

In one embodiment, the performance module 1402 includes a performance calculation module 1404 that calculates performance of an executed function executed on a processor and a correlation module 1406 that correlates a size of each executed function to performance during execution of the function to determine a performance characteristic of the processor. For example, the performance module 1402 may accumulate data from executed functions and the performance calculation module 1404 may then calculate performance of each executed function executed on a processor. The correlation module 1406 may then use results from the performance calculation module 1404 to correlate a size of the executed function to the calculated performance to determine a data point in a performance characteristic of the processor that executed the function. The performance characteristic may include amount of time to execute the function, execution time for one or more subroutines or parts of the function, energy consumption during execution of the function, etc. and may also include a combination of performance metrics. One of skill in the art will recognize other performance characteristics that may be calculated by the performance calculation module 1404 and then correlated to a function size by the correlation module 1406.

The apparatus 1400, in one embodiment, includes a context module 1408 that tracks a context for each function executed on a processor. The comparison module 1302 then compares performance characteristics of the plurality of available processors 112, 116, 120, 124, 128 with similar contexts. A context may include a type of data being evaluated, other programs running at the same time, commands in a queue, and the like. For example, an FFT function may be used for various purposes. One context may be to use FFT for evaluating what objects are in a photograph. Another context may be to use FFT to understand an image in the frequency domain. Another context may be to use FFT for analysis of a received wireless signal. Commands on a stack or in a queue may be used to understand a particular context.

A particular function may perform differently under different contexts and in one embodiment each context for a processor may include a separate performance characteristic. The context module 1408 may determine a current context so that the comparison module 1302 compares performance characteristics of available processors 112, 116, 120, 128 corresponding to a current context. The context module 1408 may also determine a context for an executed function so that the correlation module 1406 correlates a current context with a calculated performance for the executed function.

The apparatus 1400, in one embodiment, includes an update module 1410 that updates an initial performance characteristic of a processor based on the function execution data from previously executed functions. For example, the initial performance characteristic for a function may be supplied by a vendor or user. As functions are executed, the update module 1410 may use results from the performance calculation module 1404, the correlation module 1406, and the context module 1408 to modify the initial performance characteristic. In other embodiments, the initial performance characteristic may include both vendor or user supplied data mixed with data from executed functions or the initial performance characteristic may be solely from data of executed functions where the data from executed functions has completely overwritten data from a vendor or user. In some embodiments, the update module 1410 in the apparatus 1400 of FIG. 14 may share functionality with the update module 808 of the apparatus 800 of FIG. 8.

The apparatus 1400, in one embodiment, includes a function size module 810 (not shown) that is substantially similar to the function size module 810 of the apparatus 800 of FIG. 8. The apparatus 1400 may also include an intercept module 202 that intercepts a function call from an executing application where the function call specifies a target function and the target function is associated with a target processor. The intercept module 202, in one embodiment, is substantially similar to the intercept modules 202 of the apparatuses 200, 300 of FIGS. 2 and 3. In the embodiment, the comparison module 1302 compares performance characteristics of the plurality of processors in response to the intercept module 202 intercepting the function call.

In addition, the selection module 1304 selects a function from a plurality of available functions to execute the function call where each function is associated with a separate processor. The selection module 1304 selects the function associated with the processor with a best performance for execution of the function call. Also in the embodiment, the execution module 706 reroutes the function call to execute the selected function on the selected processor. In the embodiment, the selection module 1304 may be similar to or the same as the selection modules 204, 704 and the execution module 1306 may be similar to the execution modules 206, 706 described in the apparatuses 200, 300, 700 800 of FIGS. 2, 3, 7 and 8 and the selection module 1304 and the execution module 1306 includes functionality described with regard to the apparatuses 1300, 1400 of FIGS. 13 and 14 where selection criteria for a function is specified to select a processor with a best performance.

Figure 15:
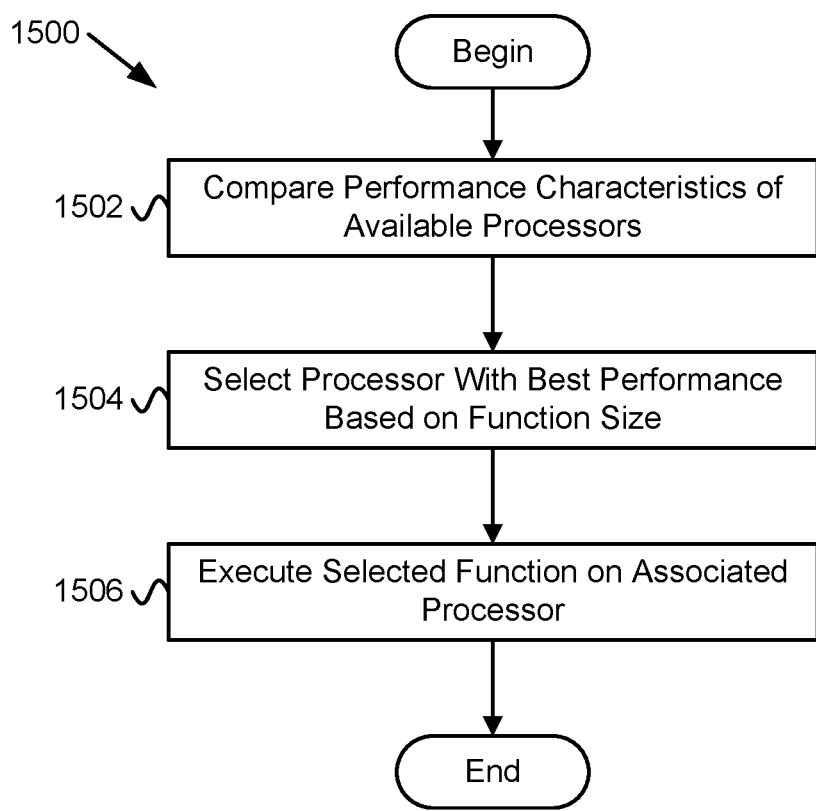
FIG. 15 is a schematic flow chart diagram illustrating one embodiment of a method for determining execution of a function call based on performance.

FIG. 15 is a schematic flow chart diagram illustrating one embodiment of a method 1500 for determining execution of a function call based on performance. The method 1500 begins and compares 1502 performance characteristics of a plurality of processors available for execution of a function (e.g. 112, 116, 120, 124, 128). Each performance characteristic varies as a function of function size. In one embodiment, the comparison module 1302 compares 1502 performance characteristics. The method 1500 selects 1504, based on a size of the function, a processor from the plurality of available processors 112, 116, 120, 124, 128 with a best performance for execution of the function and the method 1500 executes 1506 the function on the selected processor, and the method 1500 ends. In some embodiments, the selection module 1304 selects 1504 a processor and the execution module 1306 executes 1506 the selected function.

Figure 16:
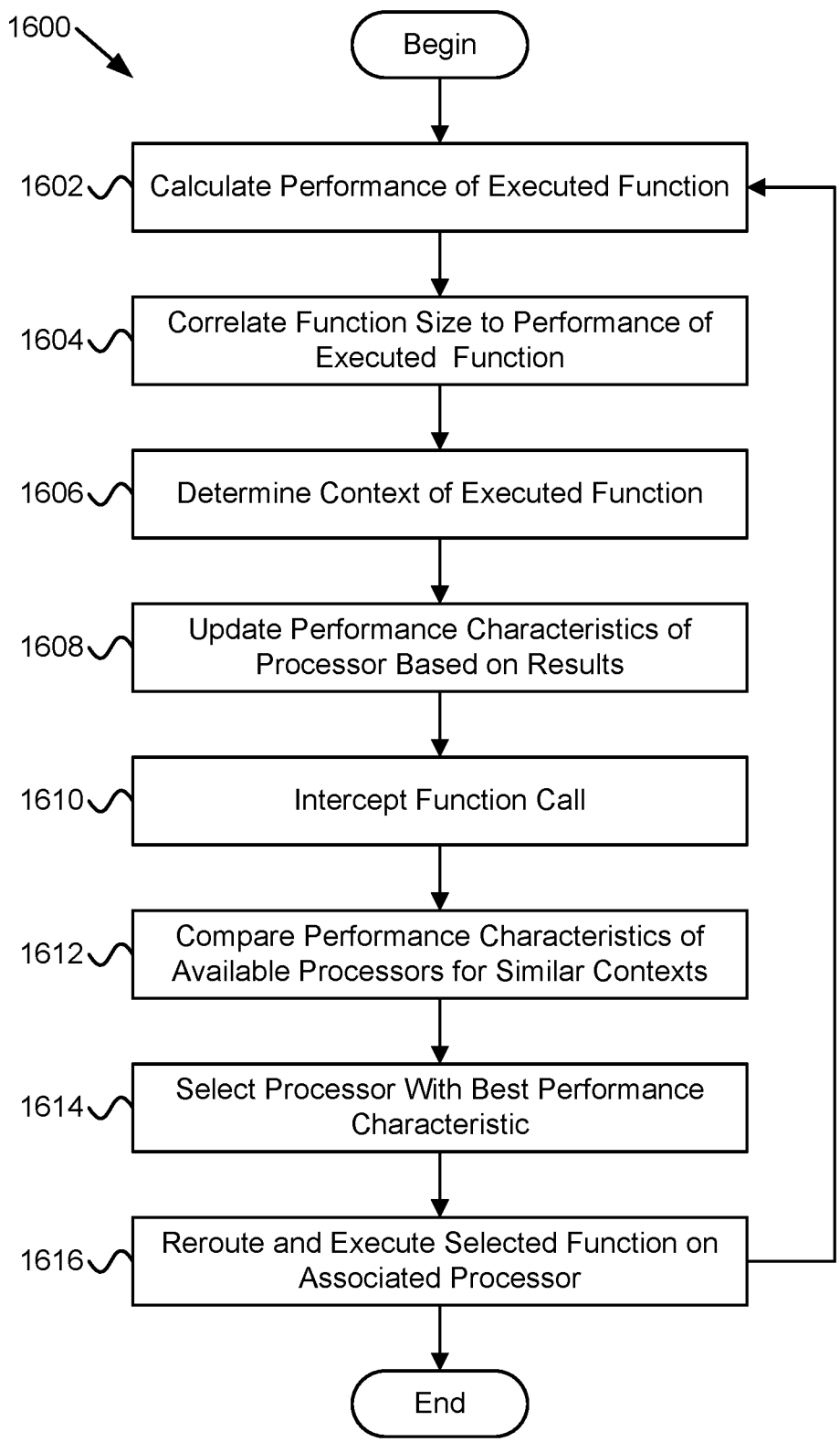
FIG. 16 is a schematic flow chart diagram illustrating one embodiment of an alternate method for determining execution of a function call based on performance.

FIG. 16 is a schematic flow chart diagram illustrating one embodiment of an alternate method 1600 for determining execution of a function call based on performance. The method 1600 begins and calculates 1602 performance of an executed function executed on a processor and correlates 1604 a size of each executed function to performance during execution of the function to determine a performance characteristic of the processor. The method 1600 correlates 1606 a context of the executed function to the performance of the executed function and updates 1608 an initial performance characteristic of a processor based on the function execution data from previously executed functions. For example, the initial performance characteristic for a processor may include a data point from a vendor or user for a particular function size that is the same function size as the executed function.

The method 1600 updates 1608 the data point with data from the executed function. In various embodiments, the performance calculation module 1404 may calculate 1602 performance of the executed function, the correlation module 1406 may correlate 1604 function size of the function to performance during execution of the function to determine a performance characteristic, the context module 1408 may determine 1606 a context of the executed function, and the update module 1410 may update 1608 performance characteristics of the processor that executed the function based on the data from the executed function.

The method 1600 intercepts 1610 a function call from an executing application where the function call specifies a target function and the target function is associated with a target processor and compares 1612 performance characteristics of a plurality of processors 112, 116, 120, 124, 128 available for execution of a function. The method 1600 may include the target processor in the comparison 1612. The intercept module 202, in one embodiment, intercepts 1610 the function call and the comparison module 1302 compares 1612 performance characteristics. The method 1600 selects 1614, based on size of the function of the function call, an available processor (e.g. the GPU 116) with a best performance and the method 1600 reroutes 1616 and executes the function on the selected processor (e.g. 116), and the method 1600 ends. In addition, the method 1600 may return and calculate 1602 performance of the newly executed function to update 1608 the performance characteristic of the processor (e.g. 116) that executed the function. In some embodiments, the selection module 1304 selects 1614 the processor and the execution module 1306 reroutes 1616 and executes the function on the selected processor.

Figure 17:
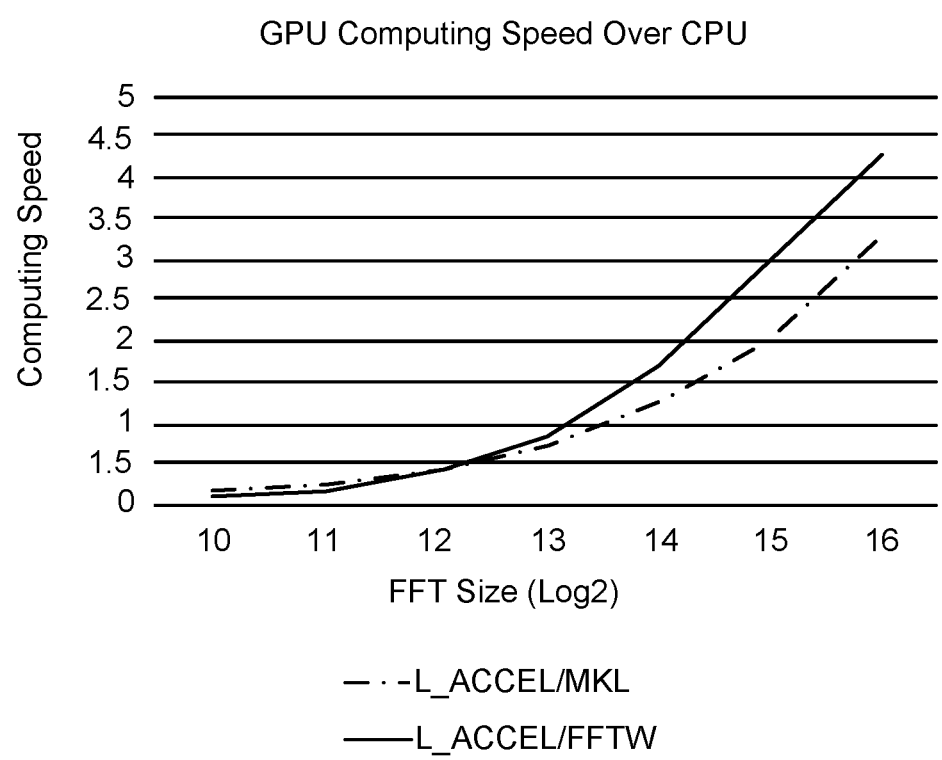
FIG. 17 is a chart depicting one embodiment of computing speed versus fast Fourier transform size of two processors.

FIG. 17 is a chart depicting one embodiment of computing speed versus fast Fourier transform size of two processors. The chart shows performance characteristics of two processors in terms of variation of computing speed as a function of function size. The vertical axis of the chart is relative computing speed and the horizontal axis depicts FFT size scaled in log base 2. The dashed line is for an accelerator (e.g. 124) executing a function from the math kernel library ("MKL") and the solid line is for an accelerator (e.g. 124) executing a similar function from the FFTW library, which is a C-language subroutine library for computing discrete FFT in one or more dimensions, of arbitrary input size, and of both real and complex data. The chart shows that both processors perform equally below a relative computing speed of 1.5, but that the processor executing a function from the FFTW library out performs the processor executing a similar function from the MKL. The comparison module 1302 may use data used to plot the chart when comparing performance data. For example, if a function has an FFT size of $2^{14}$, the selection module 1304 may select the processor executing the FFTW functions.

Figure 18:
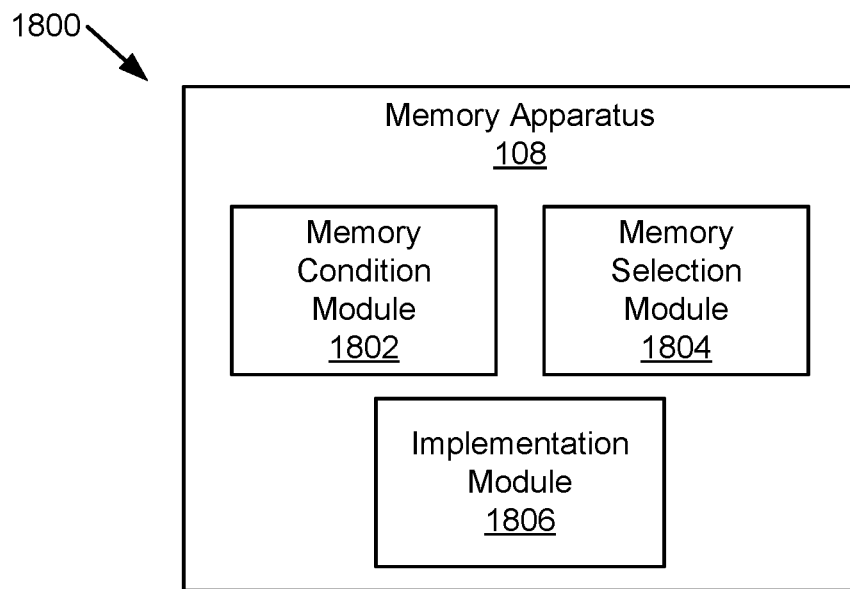
FIG. 18 is a schematic block diagram illustrating one embodiment of an apparatus for determining a memory management method.

FIG. 18 is a schematic block diagram illustrating one embodiment of an apparatus 1800 for determining a memory management method. The apparatus 1800 includes one embodiment of the memory apparatus 108 with a memory condition module 1802, a memory selection module 1804 and an implementation module 1806, which are described below. While the memory apparatus 108 is depicted in FIG. 1 in the CPU memory 110, all or a portion of the modules 1802-1806 may be located in another location. In addition, all or a portion of the modules 1802-1806 may be implemented in hardware. For example, the memory condition module 1802 may include hardware circuits to determine memory parameters. In other embodiments, the modules 1802-1808 are executable code, which may receive input from and interact with hardware circuits. One of skill in the art will recognize various ways to implement the memory apparatus 108.

The apparatus 1800, in one embodiment, includes a memory condition module 1802 that determines memory parameters of host memory and device memory prior to a device executing a function. Note that as used herein, "function" may be used interchangeably with "program," "subroutine," or other presently executable task. In one embodiment, the host memory is memory accessible by a host. The host is a processor and may be a CPU, such as one of the CPUs 112 of the system 100 of FIG. 1 or may be another processor, such as the GPU 116, the FPGA 120, etc. For example, if the host is a CPU 112, the CPU memory 110 may be the host memory.

Figure 20:
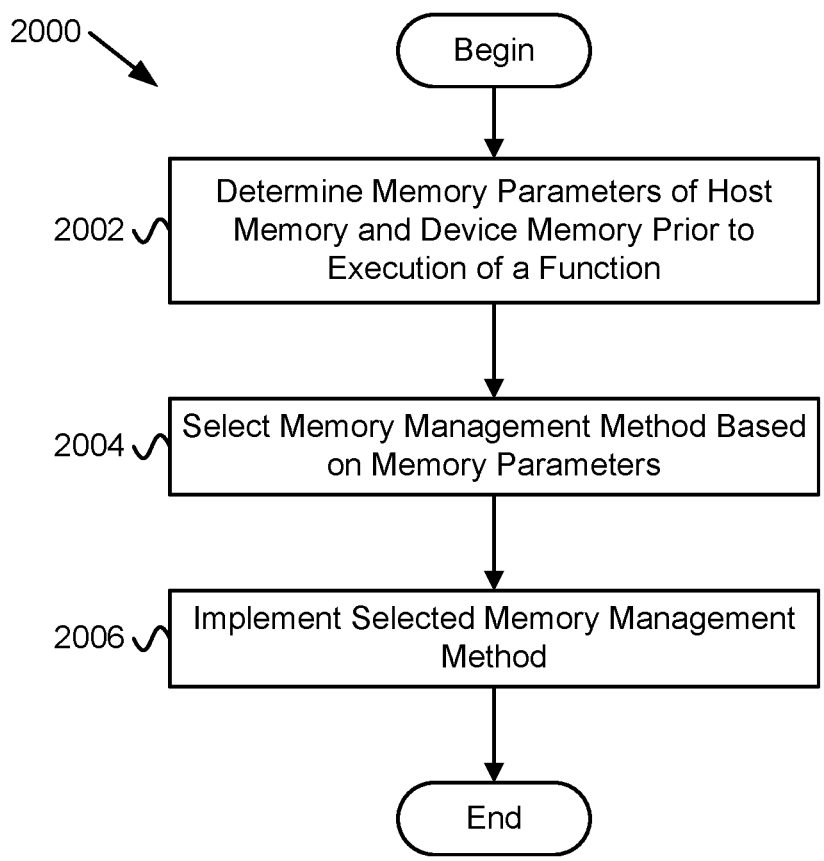
FIG. 20 is a schematic flow chart diagram illustrating one embodiment of a method for determining a memory management method.

The terms "host," "host memory," "device" and "device memory" are used in conjunction with the memory apparatus 108 and associated flowchart diagrams in FIGS. 20 and 21 as terms of art found in literature discussing various memory management methods. The host, in one embodiment, is a processor that tasks the device with execution of a function. For example, the host may be executing a program that includes a function call or may be executing a function call and the device is selected to execute a function that is compatible with a function specified in the function call. For example, the device may be the processor selected by the selection modules 204, 704, 1304 of the apparatuses 200, 300, 700, 800, 1300, 1400 of FIGS. 2, 3, 7, 8, 13, and 14. Once a selection module 204, 704, 1304 has selected a processor, and the associated execution module 206, 706, 1306 has begun or is about to begin executing a function on the selected processor, the memory condition module 1802 may determine memory parameters of the host memory and the device memory.

The device memory, in one embodiment, is memory accessible to the device. For example, if the device is a selected processor that was selected by a selection module 204, 704, 1304 and the selected processor is the GPU 116, the device memory may be GPU memory 118. Typically, the host and the device each have an associated memory. However, in some embodiments, the device may rely on the host memory and may not have any device memory, may have device memory dedicated to other tasks, may have insufficient memory, etc.

In other embodiments, the host is tasked with execution of a program, a subroutine, a function, a task or some other executable code that is independent of the apparatuses 200, 300, 700, 800, 1300, 1400 of FIGS. 2, 3, 7, 8, 13, and 14, but interacts with the device to execute all or a portion of the program, subroutine, function, etc. In one embodiment, the function is specified in a function call issued from an application executing on the host.

The host memory and/or device memory have two or more available memory management methods and the memory apparatus 108 is capable of selecting and changing a memory management method. For example, available memory management methods may include pageable, page-locked, and one of zero-copy, unified address space memory management methods, and the like. Typically, data used in the execution of a program, function, etc. is stored in the host memory and/or device memory.

The pageable memory management method is common and allows the memory apparatus 108 to store and retrieve data from secondary storage, when necessary, such as a hard disk drive, flash memory, or other non-volatile memory that is typically slower than the host memory or the device memory. Paging is often used when an amount of data used by a host for execution of a program, function, etc. exceeds available capacity of the host memory and/or device memory. Often, the host memory and/or device memory are used for multiple tasks, programs, etc. so that not all of the host/device memory is available to a particular program, function, etc.

A disadvantage of the pageable memory management method is that direct memory access ("DMA") cannot be used. DMA is a method where a DMA controller takes over transfer of data from the host memory to the device memory, which frees up the host for other tasks. However, a DMA controller typically lacks the capability to access data paged out to the secondary storage. Typically, DMA is efficient and is desirable, so a cost of choosing the pageable memory management method is loss of the ability to use DMA. However, the pageable memory management method is a good option when required data exceeds available capacity in the host memory.

The page-locked memory management method is another common memory management method and has data locked or pinned in the host memory so that data is not paged out to the secondary storage. For the page-locked memory management method, a certain amount of host memory (typically the CPU memory 110) is allocated for use for data of an executing program, function, etc. and the data is loaded into the host memory and not paged out so that the device (i.e. GPU 116, FPGA 120, etc.) can access the data through a DMA process without a memory management controller of the host being involved to retrieve paged out data back to the host memory. If the host memory was pageable, DMA typically couldn't be used because DMA is for accessing data in memory and the device or a DMA controller does not have knowledge or capability to go get data paged out to the secondary storage. For the page-locked memory management method, zero-copy memory management method, or unified address space memory management method, the amount of available host memory space to be allocated for use by the function call typically is greater than a size of the data to be loaded into the host memory.

For the zero-copy memory management method, a portion of the host memory is allocated as page-locked (e.g. pinned) memory and the allocated memory is mapped into the address space of the device. The device then has knowledge of where the data is located in the host memory, thus avoiding transferring all of the data to from the host memory to the device memory. For example, if zero-copy is used for an FFT function and the FFT function needs values A and B, a memory controller for the device may read values A and B from the host memory instead of copying data to the device memory to access values A and B.

While the zero-copy memory management method is more efficient in some instances, memory access of data in the host memory is typically slower than memory access by the device to the device memory. Often, PCI-E or a similar bus is used for the data access. In a situation where a particular host memory location is accessed multiple times, for example when a calculation uses a value repeatedly, such as for a windowing function or convolution, zero-copy may not be as efficient as the page-locked memory management method. Conversely, when a value is accessed a low number of times, for instance accessed once, and in cases where available device memory is low or non-existent, using the zero-copy memory management method is often more efficient than using the page-locked or pageable memory management methods.

Performance using the unified address space memory management method is similar to the zero-copy memory management method. One example of implementation of the unified address space memory management method is in CUDA 6. For unified address space, the host memory and the device memory share a single virtual address space with a single memory pointer. Often, the unified address space performs about the same as zero-copy. An advantage of unified address space is that writing additional software is not required for data transfer. The unified address space memory management method borrows from multi-processor cache coherency technology and the coherency protocol may be hardware based or implemented in software as a runtime, but is not managed by the application software. For example, when an application wants to use an accelerator 124, GPU 116, etc., pageable, page-locked, and zero-copy memory management methods typically require additional lines of code. However, the unified address space memory management method typically does not require extra lines of code and memory allocation is on the device. When memory is allocated for execution of a program, function, etc., host memory is marked as device memory in a virtual address space. The unified address space memory management method is similar in concept to memory for a multi-processor system.

In some embodiments, use of zero-copy or unified address space is a user's choice. Unified address space, in some embodiments, works efficiency for smaller increments of data; sizes that are related to the physical memory lines, not related to the logical size of a working set or data structure. For the unified address space memory management method, both the host and the device use the combined host memory and the device memory as their own by way of the virtual address space. Thus, in unified address space, typically when one side writes to an address, there is a protocol whereby the other side is notified that before that address is used an updated version is required.

The unified address space memory management method typically requires pinned data in the host memory, like zero-copy, and has similar efficiency issues as zero-copy. For example, if a value is accessed multiple times during execution of a function, program, subroutine, etc. using unified address space may be less efficient than the page-locked memory management method, and if data required for execution exceeds available space in the host memory, the pageable memory management method may be a better choice.

As stated above, the memory condition module 1802 determines memory parameters of host memory and device memory prior to a device executing a function. The memory parameters may include amount of available host memory, amount of available device memory, number of times a block of memory is accessed, a complexity of memory allocation based on commands in a queue, and the like. For example, the memory condition module 1802 may determine an amount of available host memory to determine if data required for execution of a function will exceed the available host memory, which may be used to determine if the pageable memory management method should be used or if another memory management method may be used instead to increase performance. The memory condition module 1802 may determine an amount of available device memory, which may be useful in determining if zero-copy or unified address space may be used efficiently during execution of a function, program, etc.

The memory condition module 1802 may determine a number of times a block of memory will be accessed, which is useful in determining if zero-copy or unified address space may be used efficiently during execution of a function, program, etc. The memory condition module 1802 may determine the number of times a block of memory is accessed by looking at data from previously executed functions, by knowledge of a function type, etc. For example, the memory condition module 1802 may determine that a function call is for a windowing function or a convolution, which may be functions known to re-access data values repeatedly. In other embodiments, the memory condition module 1802 may look at data from executed functions to determine function type, context, etc. where the data from the executed functions may include an amount of access to a same data block multiple times. Where a currently executing function is similar to an executed function and the data from the previously executed functions indicates repeated access to a memory location, the memory condition module 1802 determine that the current function will access a data block multiple times.

The memory condition module 1802 may determine a complexity of memory allocation based on commands in a queue, which may indicate that using the zero-copy or unified address space memory management spaces is efficient. For example, the memory condition module 1802 may determine if multiple function call routings are scheduled in a queue or happen concurrently. In this situation, zero-copy or unified address space may be good selections. One of skill in the art will recognize other situations that increase complexity of memory allocation. The pageable, page-locked, zero-copy, and unified address space memory management methods are described herein for convenience and other memory management methods may also be used by the memory apparatus 108.

The apparatus 1800 includes, in one embodiment, a memory selection module 1804 that selects a memory management method based on the memory parameters. For example, the memory selection module 1804 may determine that data for a currently executing function, program, subroutine, etc. exceeds available space in the host memory and the memory selection module 1804 may select the pageable memory management method. The memory selection module 1804, in one embodiment, changes from a current memory management method to the selected memory management method. The apparatus 1800, in one embodiment, includes an implementation module 1806 that implements the selected memory management method in association with execution of the function, program, subroutine, etc. In one embodiment, the memory apparatus 108 functions dynamically after the intercept module 202 intercepts a function call. In other embodiments, the memory apparatus 108 operates prior to execution of a function in conditions where a device will execute the function. One of skill in the art will recognize other suitable times for the memory apparatus 108 to evaluate various memory management methods and change from a current memory management method to another memory management method.

Figure 19:
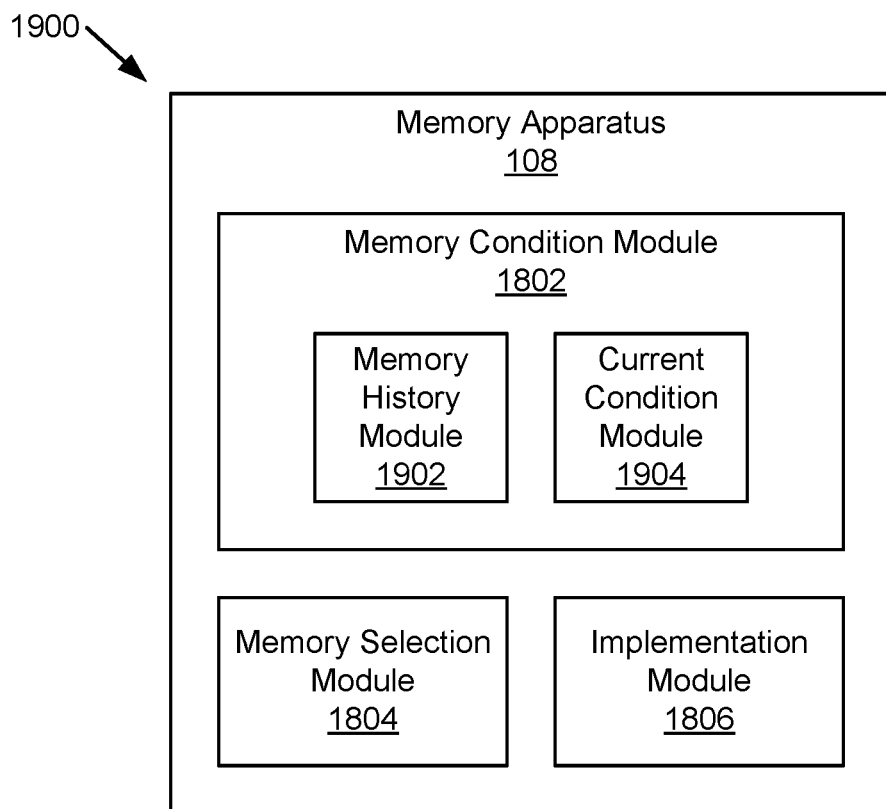
FIG. 19 is a schematic block diagram illustrating one embodiment of an alternate apparatus for determining a memory management method.

FIG. 19 is a schematic block diagram illustrating one embodiment of an alternate apparatus 1900 for determining a memory management method. The apparatus 1900 includes another embodiment of the memory apparatus 108 with a memory condition module 1802, a memory selection module 1804 and an implementation module 1806, which are substantially similar to those described above in relation to the apparatus 1800 of FIG. 18. In various embodiments, the apparatus 1900 may also include one or more of a memory history module 1902 and a current condition module 1904 in the memory condition module 1802, which are described below.

In one embodiment, the apparatus 1900 includes a memory history module 1902 that determines memory parameters present during execution of one or more previously executed functions. The memory history module 1902, in one embodiment, tracks, along with the memory parameters of an executed function, function type, function parameters, and/or which device executed the function, where several devices were available for execution of the function. In addition, the memory history module 1902 may track other useful information, such as context of an executed function. The memory selection module 1804 may use the memory parameters from the memory history module 1902 to select a memory management method.

In another embodiment, the apparatus 1900 includes a current condition module 1904 that determines current memory parameters of the host memory and the device memory. The memory selection module 1804 may use the current memory parameters in selecting a memory management method. For example, the current condition module 1904 may determine an amount of available host memory, an amount of available device memory, a size of data used by a function that is about to be executed, status of other executing functions, programs, etc. to assess an amount of memory that be available once a function has been fully executed, and other current conditions that may affect selection of a memory management method.

In one embodiment, the memory selection module 1804 selects the pageable memory management method in response to the memory condition module 1802 determining that the available host memory is below a host memory threshold. The host memory threshold, in one embodiment, is a fixed amount of memory. In another embodiment, the host memory threshold is related to a size of data used by the function that is about to be executed. In another embodiment, the host memory threshold is related to the function. For example, each function in a library may require a particular mount of host memory for execution or for a particular memory management method. One of skill in the art will recognize other host memory thresholds.

In another embodiment, the memory selection module 1804 selects the page-locked memory management method in response to the memory condition module 1802 determining that the available host memory is above the host memory threshold and the available device memory is above a device memory threshold, a same memory block in the host memory is accessed more than a memory block access threshold and/or the complexity of memory allocation is below a complexity threshold. The device memory threshold, in one embodiment, is related to the size of the data used the by the function that is about to be executed. In other embodiments, the device memory threshold is related to other parameters useful in selecting a memory management method.

The memory block access threshold may be set based on performance of a function using the page-locked memory management method versus using the zero-copy or unified address space memory management methods. Typically, the memory block access threshold is set at a low value because repeated access of a memory block typically indicates that the page-locked memory management method is more efficient than the zero-copy or unified address space memory management methods.

In one embodiment, complexity of memory allocation is expressed as a value and the complexity threshold is set at a value indicative of a low amount of complexity of memory allocation. One of skill in the art will recognize ways to determine complexity of memory allocation and to convert the complexity to a value.

In another embodiment, the memory selection module 1804 selects the zero-copy memory management method or the unified address space memory management method in response to the memory condition module 1802 determining that the available host memory is above the host memory threshold and the available device memory is below the device memory threshold, a same page in the host memory is accessed less than a page access threshold and/or the complexity of memory allocation is above a complexity threshold. Where other memory management methods are available, other memory management method selection criteria may be used by the memory selection module 1804 to select a memory management method.

In one embodiment, each memory management method includes at least one weighting factor and the memory condition module 1802 adjusts the weighting factor(s) of each memory management method based on the determined memory parameters and the memory selection module 1804 selects the memory management method based on the weighting factors. For example, if the memory condition module 1802 determines that the available host memory is lower that the size of data to be used in executing a function, the memory condition module 1802 may increase a weighting factor for the pageable memory management method and may also lower a weighting factor for the page-locked, zero-copy, and united address space memory management methods. Other memory parameters may also increase or decrease the weighting factors.

In one embodiment, each memory management method has both a historical weighting factor and a current conditions weighting factor and the memory history module 1902 adjusts the historical weighting factor of each memory management method based on memory parameters present during execution of the previously executed functions. In the embodiment, the current condition module 1904 adjusts the current conditions weighting factor of each memory management method based on current memory parameters of the host memory and the device memory. The memory condition module 1802 combines the historical weighting factor and the current conditions weighting factor for each memory management method. The memory selection module 1804 may then use the combined weighting factors to select a memory management method.

FIG. 20 is a schematic flow chart diagram illustrating one embodiment of a method 2000 for determining a memory management method. The method 2000 begins and determines 2002 memory parameters of host memory and device memory prior to a device executing a function. In one embodiment, the memory condition module 1802 determines 2002 the memory parameters. The memory parameters may include amount of available host memory, amount of available device memory, number of times a block of memory is accessed, a complexity of memory allocation based on commands in a queue, and the like and may use data from previously executed functions.

The method 2000 selects 2004 a memory management method based on the memory parameters, such as the pageable, page-locked, zero-copy, or unified address space memory management methods. In one embodiment, the memory selection module 1804 selects 2004 a memory management method. The method 2000 implements 2006 the selected memory management method in association with execution of the function, and the method 2000 ends. For example, the method 2000 may implement 2006 the selected memory management method after a function call and before the function specified in the function call is executed or a function selected after intercepting a function call is executed. In one embodiment, the implementation module 1806 implements 2006 the selected memory management method.

Figure 21A:
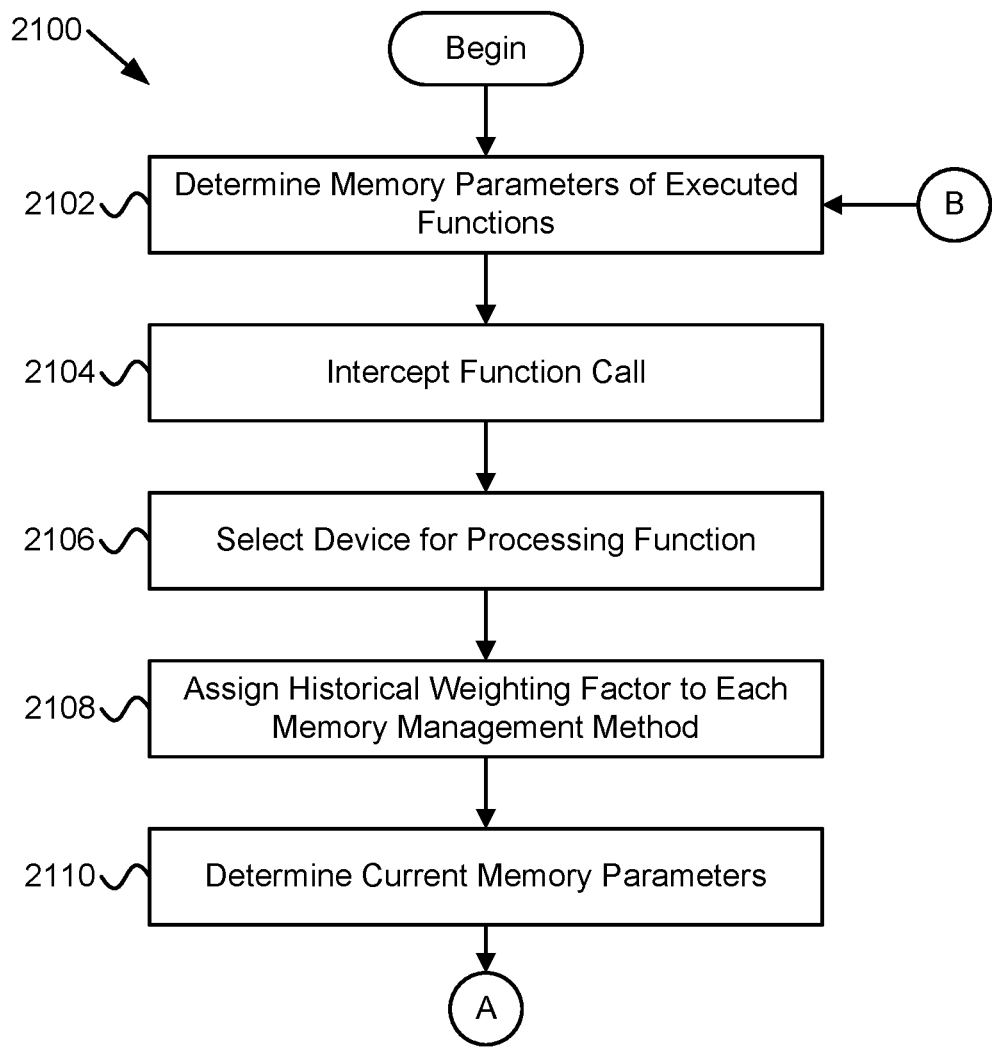
FIG. 21A is a first part of a schematic flow chart diagram illustrating one embodiment of an alternate method for determining a memory management method.
Figure 21B:
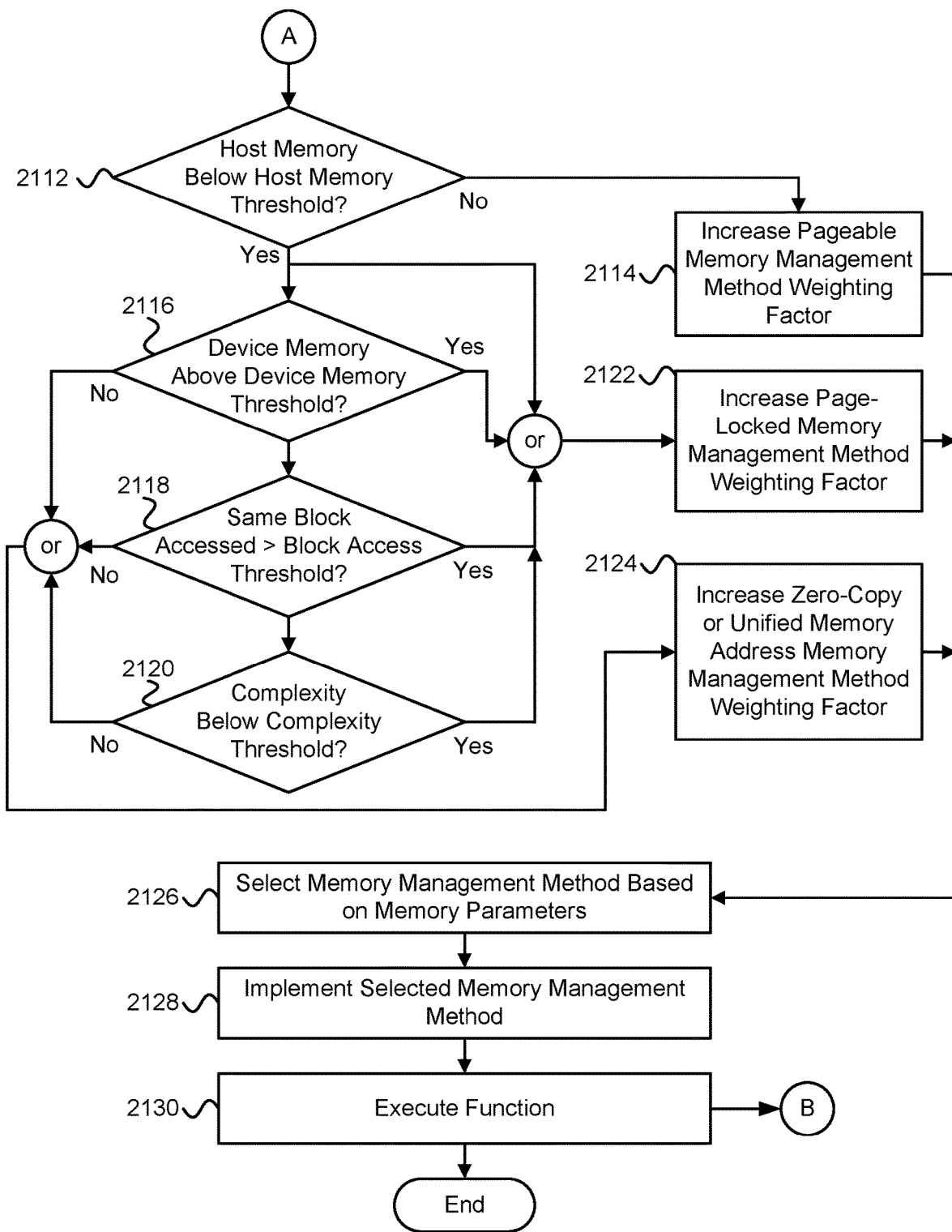
FIG. 21B is a second part of a schematic flow chart diagram illustrating one embodiment of the alternate method for determining a memory management method.

FIG. 21A is a first part and FIG. 21B is a second part of a schematic flow chart diagram illustrating one embodiment of an alternate method 2200 for determining a memory management method. The method 2100 begins and determines 2102 memory parameters present during execution of previously executed functions. For example, the memory history module 1902 may determine 2102 memory parameters of the executed functions.

The method 2100, in one embodiment, intercepts 2104 a function call and selects 2106 a device for processing the function. For example, the intercept module 202 may intercept 2104 the function call prior to a selection module (e.g. 204, 704, 1304) selecting 2106 a device (e.g. an available processor 112, 116, 120, 124, 128) to execute a function that is the same or similar to the function specified in the function call. For example, the method 2100 may execute in conjunction with the methods 500, 600, 900, 1000, 1500, 1600 of FIGS. 5, 6, 9, 10, 15 and 16.

The method 2100 assigns 2108 a historical weighting factor to each memory management method based on memory parameters from the executed functions. The memory history module 1902 may assign 2108 the weighting factors. The method 2100 determines 2110 current memory parameters of the host memory and the device memory. For example, the current condition module 2110 may determine 2104 current memory parameters.

The method 2100 determines 2112 (follow A on FIG. 21A to A on FIG. 21B) if the amount of available host memory is below a host memory threshold. If the method 2100 determines 2112 that the amount of available host memory is not below the host memory threshold, the method 2100 increases 2114 a weighting factor for the pageable memory management method. If the method 2100 determines 2112 that the amount of available host memory is below the host memory threshold, the method 2100 moves on to three other test steps (e.g. 2116, 2118, 2120). In one embodiment, the method 2100 determines 2116 if the device memory is above a device memory threshold. In another embodiment, the method 2100 determines 2118 if the same memory block is access more than a block access threshold. In another embodiment, the method 2100 determines 2120 if complexity of memory allocation is below a complexity threshold. The method 2100 may also decrease a weighing factor for the page-locked, zero-copy or unified address space memory management methods.

If the method 2100 determines 2116 that the device memory is above a device memory threshold or determines 2118 that the same memory block is access more than a block access threshold or determines 2120 that complexity of memory allocation is below a complexity threshold, the method 2100 increases 2122 the page-locked memory management method weighting factor. If the method 2100 determines 2116 that the device memory is not above a device memory threshold or determines 2118 that the same memory block is not accessed more than a block access threshold or determines 2120 that complexity of memory allocation is not below a complexity threshold, the method 2100 increases 2124 the weighting factor of the zero-copy or unified address space memory management methods. The method 2100 may decrease other weighting factors when a weighting factor is increased. The method 2100 may also include one or more formulas or algorithms to determine an amount to increase or decrease each weighting factor based on determined conditions. The method 2100 may use data from previously executed functions and/or current memory parameters to increase or decrease various weighting factors.

The method 2100 selects 2126 a memory management method based on the various weighting factors and implements 2128 the selected memory management method. For example, the memory selection module 1804 may select 2126 a memory management method and the implementation module 1806 may implement 2128 the selected memory management method. The method 2100 executes 2130 the function, and the method 2100 ends. For example, an execution module 206, 706, 1306 may execute the function. The method 2100 may also return (follow B on FIG. 21B to B on FIG. 21A) to determine 2102 memory management parameters from the presently executed function.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method comprising:
    determining a performance characteristic of each of a main processor and a plurality of alternate processors based on function execution data from a plurality of previously executed functions;
    tracking a context for each previously executed function executed on the main processor and on a processor of the alternate plurality of processors;
    comparing performance characteristics of the main processor and the plurality of the alternate processors available for execution of a function, wherein the compared performance characteristics are derived from the plurality of previously executed functions and comprise a similar context to the function, and wherein each performance characteristic varies as a function of function size, the performance characteristics comprising an amount of time to execute the function on a particular processor of the main processor and the plurality of alternate processors;
    selecting, based on a size of the function; a processor from the main processor and the plurality of alternate processors with a best performance for execution of the function, wherein the selected processor has a lowest execution time for the function; and
    executing the function on the selected processor.

2. The method of claim 1, wherein determining the performance characteristic of the main processor and each of the plurality of alternate processors further comprises:
    calculating performance of an executed function executed on a processor of the main processor or a processor of the plurality of alternate processors; and
    correlating a size of each executed function to performance during execution of the function to determine a performance characteristic of the processor of the main processor or a processor of the plurality of alternate processors.

3. The method of claim 1, wherein determining the performance characteristic of the main processor and each of the plurality of alternate processors is based on function execution data from previously executed functions and:
- information supplied with the function; and/or
- information from a vendor associated with the main processor or a processor of the plurality of alternate processors.

4. The method of claim 1, wherein determining the performance characteristic of the main processor and each of the plurality of alternate processors further comprises updating an initial performance characteristic of a processor of the main processor or a processor of the plurality of alternate processors based on the function execution data from previously executed functions.

5. A program product comprising a non-transitory computer readable storage medium that stores code executable by a processor, the executable code comprising code to perform:
- determining a performance characteristic of each of a main processor and a plurality of alternate processors based on function execution data from a plurality of previously executed functions;
- tracking a context for each previously executed function executed on the main processor and on a processor of the plurality of alternate processors;
- comparing performance characteristics of the main processor and the plurality of the alternate processors available for execution of a function, wherein the compared performance characteristics are derived from the plurality of previously executed functions and comprise a similar context to the function, and wherein each performance characteristic varies as a function of function size, the performance characteristics comprising an amount of time to execute the function on a particular processor of the main processor and the plurality of alternate processors;
- selecting, based on a size of the function; a processor from the main processor and the plurality of alternate processors with a best performance for execution of the function, wherein the selected processor has a lowest execution time for the function; and
- executing the function on the selected processor.

6. The program product of claim 5, wherein determining the performance characteristic of each of the plurality of processors further comprises:
- calculating performance of an executed function executed on a processor of the main processor or a processor of the plurality of alternate processors; and
- correlating a size of each executed function to performance during execution of the function to determine a performance characteristic of the processor of the main processor or a processor of the plurality of alternate processors.

7. The program product of claim 5, determining the performance characteristic of the main processor and each of the plurality of alternate processors is based on function execution data from previously executed functions and:
- information supplied with the function; and/or
- information from a vendor associated with the main processor or a processor of the plurality of alternate processors.

8. The program product of claim 5, wherein determining the performance characteristic of the main processor and each of the plurality of alternate processors further comprises updating an initial performance characteristic of a processor of the main processor or a processor of the plurality of alternate processors based on the function execution data from previously executed functions.

9. The program product of claim 5, further comprising selecting multiple processors from the main processor and the plurality of alternate processors with similar best performance characteristics, based on the size of the function, for execution of the function and executing the function on the multiple selected processors.

10. The program product of claim 5, further comprising, in response to selecting a processor for execution of the function, formatting the function for execution on the selected processor, wherein the function is formatted for a central-processing unit ("CPU") prior to formatting for the selected processor.

11. The program product of claim 5, wherein the performance characteristics of the plurality of alternate processors comprise one or more of speed of execution, energy efficiency, and cost of execution of a functions of various sizes.

12. The program product of claim 5, wherein each of the plurality of alternate processors comprises at least one field-programmable gate array ("FPGA") and at least one graphics processing unit ("GPU").

13. The method of claim 1, further comprising selecting multiple processors from the main processor and the plurality of alternate processors with similar best performance characteristics, based on the size of the function, for execution of the function and executing the function on the multiple selected processors.

14. The method of claim 1, further comprising, in response to selecting a processor for execution of the function, formatting the function for execution on the selected processor, wherein the function is formatted for a central-processing unit ("CPU") prior to formatting for the selected processor.

15. The method of claim 1, wherein the performance characteristics of the plurality of alternate processors comprise one or more of speed of execution, energy efficiency, and cost of execution of a functions of various sizes.

16. The method of claim 1, wherein each of the plurality of alternate processors comprises at least one field-programmable gate array ("FPGA") and at least one graphics processing unit ("GPU").

* * * * *